United States Patent
Choi et al.

(10) Patent No.: US 9,973,765 B2
(45) Date of Patent: May 15, 2018

(54) METHOD AND APPARATUS FOR CODING MULTILAYER VIDEO, METHOD AND APPARATUS FOR DECODING MULTILAYER VIDEO

(71) Applicant: SAMSUNG ELECTRONICS CO., LTD., Suwon-si (KR)

(72) Inventors: Byeong-doo Choi, Suwon-si (KR); Min-woo Park, Hwaseong-si (KR); Jeong-hoon Park, Seoul (KR); Jae-won Yoon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 222 days.

(21) Appl. No.: 14/760,251

(22) PCT Filed: Jan. 10, 2014

(86) PCT No.: PCT/KR2014/000336
§ 371 (c)(1),
(2) Date: Jul. 10, 2015

(87) PCT Pub. No.: WO2014/109609
PCT Pub. Date: Jul. 17, 2014

(65) Prior Publication Data
US 2015/0350660 A1 Dec. 3, 2015

Related U.S. Application Data

(60) Provisional application No. 61/751,053, filed on Jan. 10, 2013.

(51) Int. Cl.
*H04N 19/159* (2014.01)
*H04N 19/31* (2014.01)
(Continued)

(52) U.S. Cl.
CPC .......... *H04N 19/31* (2014.11); *H04N 13/0003* (2013.01); *H04N 19/423* (2014.11); *H04N 19/61* (2014.11)

(58) Field of Classification Search
CPC .......... H04N 19/31; H04N 13/00; H04N 7/26; H04N 7/32; H04N 7/36; H04N 13/04;
(Continued)

(56) References Cited

U.S. PATENT DOCUMENTS 8,611,412 B2 12/2013 Ying et al.
8,649,434 B2 2/2014 Takahashi et al.
(Continued)

FOREIGN PATENT DOCUMENTS

CN 102726046 A 10/2012
CN 102860008 A 1/2013
(Continued)

OTHER PUBLICATIONS

Int. Search Report dated Apr. 29, 2014 issued in Application No. PCT/KR2014/000336 (PCT/ISA/210).
(Continued)

*Primary Examiner* — Dramos I Kalapodas
(74) *Attorney, Agent, or Firm* — Sughrue Mion, PLLC

(57) ABSTRACT

Disclosed are methods for coding and decoding a multilayer video. The method for decoding a multilayer comprise: decoding a first layer picture and saving same to a decoded picture buffer (DPB); marking the first layer picture as a short-term reference picture; obtaining interlayer RPS information of a second layer picture which has a first POC identical to that of the first layer picture and which is interlayer-predicted by referencing the first layer picture; marking the first layer picture which has been marked as the short-term reference picture as a long-term reference picture, based on the interlayer RPS information; and perform-
(Continued)

ing interlayer prediction with respect to the second layer picture by referencing the first layer picture which has been marked as the long-term reference picture.

6 Claims, 17 Drawing Sheets

(51) Int. Cl.
  *H04N 13/00* (2018.01)
  *H04N 19/423* (2014.01)
  *H04N 19/61* (2014.01)
(58) Field of Classification Search
  CPC .... H04N 19/187; H04N 19/463; H04N 19/70; H04N 19/33; H04N 19/105; H04N 19/00569; H04N 19/159; H04N 19/172; H04N 19/50; H04N 19/00763; H04N 19/597; H04N 13/0048
  See application file for complete search history.

(56) References Cited

U.S. PATENT DOCUMENTS

| | | | | |
|---|---|---|---|---|
| 8,938,011 B2* | 1/2015 | Pahalawatta | ......... | H04N 19/597 375/240.25 |
| 9,467,690 B2* | 10/2016 | He | ................. | H04N 21/23432 |
| 2009/0003445 A1* | 1/2009 | Ying | ................... | H04N 19/105 375/240.15 |
| 2011/0080949 A1* | 4/2011 | Takahashi | ............ | H04N 19/597 375/240.12 |
| 2013/0208792 A1* | 8/2013 | He | ................... | H04N 19/00569 375/240.12 |
| 2014/0049604 A1* | 2/2014 | Chen | ..................... | H04N 19/597 348/43 |
| 2014/0192895 A1* | 7/2014 | Chen | ..................... | H04N 19/597 375/240.25 |
| 2015/0103881 A1* | 4/2015 | Hendry | ................ | H04N 19/184 375/240.02 |
| 2015/0264377 A1* | 9/2015 | He | ........................ | H04N 19/30 375/240.12 |
| 2015/0334399 A1* | 11/2015 | Hendry | ................ | H04N 19/105 375/240.12 |

FOREIGN PATENT DOCUMENTS

| | | |
|---|---|---|
| JP | 2009-522888 A | 6/2009 |
| JP | 2012-28960 A | 2/2012 |
| KR | 10-2008-0027190 A | 3/2008 |
| KR | 10-2011-0037853 A | 4/2011 |
| WO | 2011/129620 A2 | 10/2011 |
| WO | 2012/119855 A1 | 9/2012 |
| WO | 2013/002700 A1 | 1/2013 |

OTHER PUBLICATIONS

Written Opinion dated Apr. 29, 2014 issued in Application No. PCT/KR2014/000336 (PCT/ISA/237).
Communication dated Mar. 2, 2018, issuued by The State Intellectual Property Office of P.R. China in counterpart Chinese application No. 201480013779.9.

* cited by examiner

FIG. 7
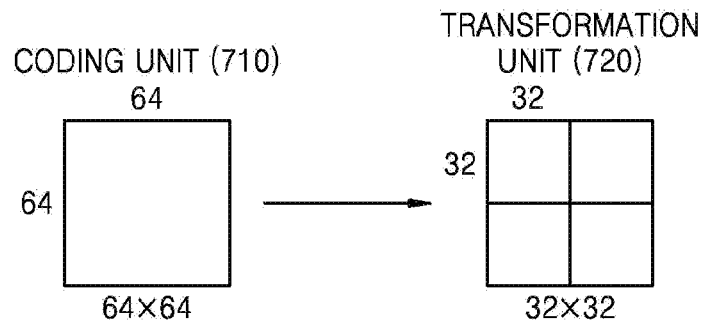
FIG. 8
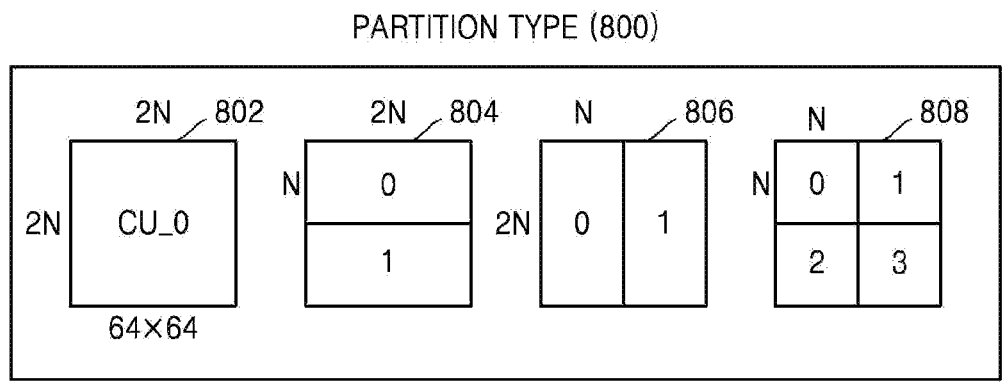
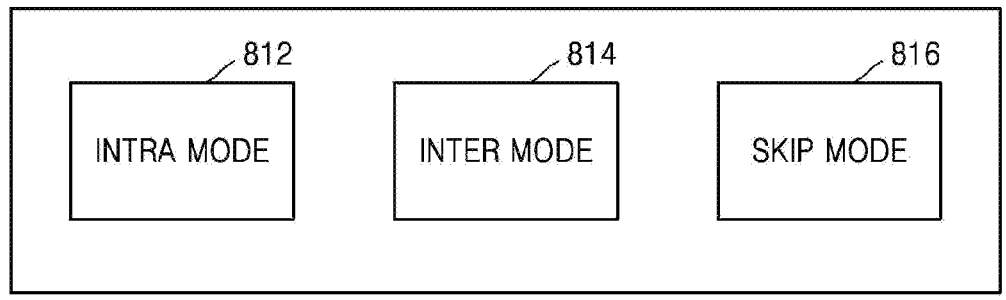
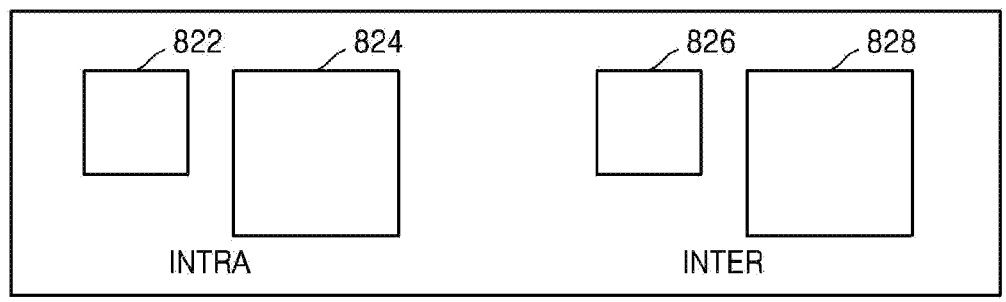

CODING UNIT (1010)

METHOD AND APPARATUS FOR CODING MULTILAYER VIDEO, METHOD AND APPARATUS FOR DECODING MULTILAYER VIDEO

CROSS-REFERENCE TO RELATED PATENT APPLICATION

This application is a National Stage application under 35 U.S.C. § 371 of International Application No. PCT/KR2014/000336, filed on Jan. 10, 2014, and claims the benefit of U.S. Provisional Application No. 61/751,053, filed on Jan. 10, 2013 in the United States Patent and Trademark Office, the disclosures of which are incorporated herein by reference in their entireties.

BACKGROUND

1. Field

Methods and apparatuses consistent with exemplary embodiments relate to encoding and decoding of a multilayer video, and more particularly, to a method of managing a decoded picture buffer storing a decoded picture.

2. Description of the Related Art

In general, image data is encoded by a codec according to a predetermined data compression standard, for example, the Moving Picture Expert Group (MPEG) standard, and then stored in an information storage medium in the form of a bitstream or transmitted via a communication channel.

Scalable video coding (SVC), as a video compression method, appropriately adjusts and transmits an amount of information in accordance with various communication networks and terminals. A multi-view video coding compresses a multi-view video such as a three-dimensional image.

Such conventional SVC or multi-view video coding encodes video by using a limited encoding method based on a macroblock of a predetermined size.

SUMMARY

Methods and apparatuses consistent with exemplary embodiments relate to a method of efficiently managing a decoded picture buffer used in decoding pictures included in a multilayer video. Methods and apparatuses consistent with exemplary embodiments also relate to a method of efficiently transmitting reference picture information included in a multilayer in order to efficiently manage a decoded picture buffer when decoding a multilayer video.

According to aspects of an exemplary embodiment, a decoded picture buffer is managed by signaling reference picture information referred to by each picture of a multilayer during interlayer prediction.

According to aspects of exemplary embodiments, a decoded picture buffer is managed by signaling reference picture information referred to by each picture of a multilayer during interlayer prediction. According to aspects of exemplary embodiments, a reference relationship between respective pictures may be efficiently transmitted by reflecting interlayer prediction of pictures included in a multilayer video. Also, according to aspects of exemplary embodiments, a decoded picture buffer used in decoding a multilayer video may be efficiently managed.

According to an aspect of an exemplary embodiment, there is provided a multilayer video decoding method including: decoding a first layer picture and storing the first layer picture in a decoded picture buffer (DPB) and marking the first layer picture as a short-term reference picture; obtaining interlayer reference picture set (RPS) information of a second layer picture that has a same first picture order count (POC) as a POC the first layer picture and is interlayer predicted by referring to the first layer picture; marking the first layer picture marked as the short-term reference picture, as a long-term reference picture based on the interlayer RPS information; and performing interlayer prediction on the second layer picture by referring to the first layer picture marked as the long-term reference picture.

According to an aspect of an exemplary embodiment, there is provided a multilayer video decoding apparatus including: a decoded picture buffer configured to store a decoded picture; a parser configured to obtain interlayer reference picture set (RPS) information of a second layer picture that has a same first POC as a POC of a previously decoded first layer picture and is interlayer predicted by referring to the first layer picture; a decoded picture buffer controller configured to store the first layer picture in the decoded picture buffer, mark the first layer picture as a short-term reference picture, and mark the first layer picture marked as the short-term reference picture, as a long-term reference picture, based on the interlayer RPS information; and a video encoder configured to decode pictures included in a multilayer, and perform interlayer prediction on the second layer picture by referring to the first layer picture marked as the long-term reference picture.

According to an aspect of an exemplary embodiment, there is provided a multilayer video encoding method including: determining a reference relationship between pictures included in a multilayer by performing intra prediction, inter prediction, and interlayer prediction on pictures included in the multilayer; and generating, based on the reference relationship, interlayer reference picture set (RPS) information indicating a reference relationship between pictures that have a same picture order count (POC) and are included in different layers, with respect to the pictures included in the other layers.

According to an aspect of an exemplary embodiment, there is provided a multilayer video encoding apparatus including: a video encoder configured to determine a reference relationship between pictures included in the multilayer by performing intra prediction, inter prediction, and interlayer prediction on pictures included in the multilayer; and a reference picture set (RPS) information generating unit configured to generate, based on the reference relationship, interlayer RPS information indicating a reference relationship between pictures that have a same picture order count (POC) and are included in different layers.

BRIEF DESCRIPTION OF THE DRAWINGS

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

DETAILED DESCRIPTION OF EXEMPLARY EMBODIMENTS

Exemplary embodiments will now be described more fully with reference to the accompanying drawings, in which the exemplary embodiments are shown.

Figure 1:
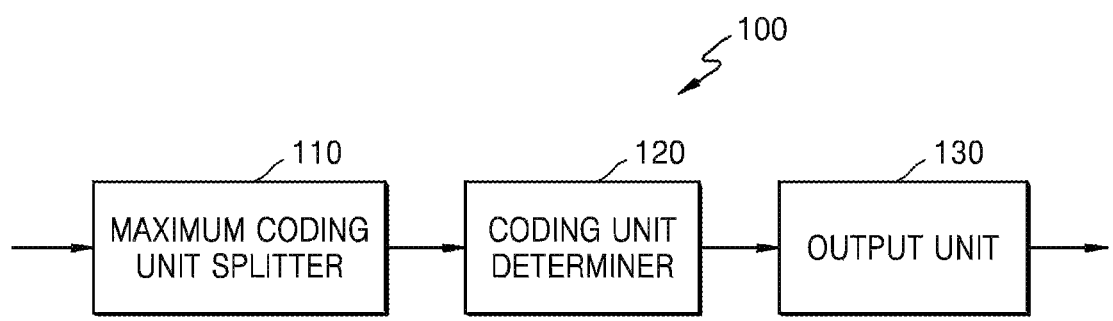
FIG. 1 is a block diagram of a video encoding apparatus based on coding units having a tree structure, according to an exemplary embodiment.

FIG. 1 is a block diagram of a video encoding apparatus, according to an exemplary embodiment.

The video encoding apparatus 100 includes a maximum coding unit splitter 110, a coding unit determiner 120, and an output unit 130.

The maximum coding unit splitter 110 may split a current picture based on a maximum coding unit that is a coding unit having a maximum size for the current picture of an image. If the current picture is larger than the maximum coding unit, image data of the current picture may be split into the at least one maximum coding unit. The maximum coding unit may be a data unit having a size of 32×32, 64×64, 128×128, or 256×256 or the like, and a shape of the data unit is a square having a width and a length that are each equal to 2 raised to a power ($2^N$) and are greater than 8. The image data may be output to the coding unit determiner 120 according to the at least one maximum coding unit.

A coding unit may be characterized by a maximum size and a depth. The depth denotes a number of times the coding unit is spatially split from the maximum coding unit, and as the depth increases, deeper coding units according to depths may be split from the maximum coding unit to a minimum coding unit. A depth of the maximum coding unit is an uppermost depth and a depth of the minimum coding unit is a lowermost depth. Because a size of a coding unit corresponding to each depth decreases as the depth of the maximum coding unit increases, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Because the maximum coding unit is split according to depths, the image data of a spatial domain included in the maximum coding unit may be hierarchically classified according to depths.

A maximum depth and a maximum size of a coding unit, which limit a total number of times a height and a width of the maximum coding unit are hierarchically split, may be previously set.

The coding unit determiner 120 encodes at least one split region obtained by splitting a region of the maximum coding unit according to depths, and determines a depth to output final encoding results according to the at least one split region. In other words, the coding unit determiner 120 determines a coded depth by encoding the image data in the deeper coding units according to depths, according to the maximum coding unit of the current picture, and selecting a depth having a smallest encoding error. The determined coded depth and the image data according to the maximum coding unit are output to the output unit 130.

The image data in the maximum coding unit is encoded based on the deeper coding units corresponding to at least one depth equal to or less than the maximum depth, and encoding results are compared based on each of the deeper coding units. A depth having the smallest encoding error may be selected after comparing encoding errors of the deeper coding units. At least one coded depth may be selected for each maximum coding unit.

A size of the maximum coding unit is split as a coding unit is hierarchically split according to depths, and a number of coding units increases. Also, even if coding units correspond to the same depth in one maximum coding unit, it is determined whether to split each of the coding units corresponding to the same depth to a lower depth by measuring an encoding error of the data of each coding unit, separately. Accordingly, even when data is included in one maximum coding unit, the encoding errors according to depths may differ according to regions, and thus the coded depths may differ according to regions. Thus, one or more coded depths may be set for one maximum coding unit, and the data of the maximum coding unit may be divided according to coding units of the one or more coded depths.

Accordingly, the coding unit determiner 120 may determine coding units having a tree structure included in a current maximum coding unit. The 'coding units having a tree structure' include coding units corresponding to a depth determined to be a coded depth, from among all coding units corresponding to depths included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to a number of times splitting is performed from a maximum coding unit to a minimum coding unit. A maximum depth according to a first exemplary embodiment may denote a total number of times splitting is performed from the maximum coding unit to the minimum coding unit. A maximum depth according to a second exemplary embodiment may denote a total number of depth levels from the maximum coding unit to the minimum coding unit. For example, when a depth of the maximum coding unit is 0, a depth of a coding unit in which the maximum coding unit is split once may be set to 1, and a depth of a coding unit in which the maximum coding unit is split twice may be set to 2. In this case, if the minimum coding unit is a coding unit obtained by splitting the maximum coding unit four times, 5 depth levels of depths 0, 1, 2, 3 and 4 exist, and thus the first maximum depth may be set to 4 and the second maximum depth may be set to 5.

Prediction encoding and frequency transformation may be performed according to the maximum coding unit. The prediction encoding and the transformation are also performed based on the deeper coding units according to a depth equal to or less than the maximum depth, according to the maximum coding unit.

Because a number of deeper coding units increases whenever the maximum coding unit is split according to depths, encoding including the prediction encoding and the frequency transformation is performed on all of the deeper coding units generated as the depth increases. For convenience of description, the prediction encoding and the frequency transformation will now be described based on a coding unit of a current depth, from among at least one maximum coding unit.

The video encoding apparatus 100 may variously select a size or shape of a data unit for encoding the image data. In order to encode the image data, operations, such as prediction encoding, frequency transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit to perform the prediction encoding on the image data in the coding unit.

In order to perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit.' A partition obtained by splitting the prediction unit may include a prediction unit and a data unit obtained by splitting at least one of a height and a width of the prediction unit.

For example, when a coding unit of 2N×2N (where N is a positive integer) is no longer split, the coding unit may become a prediction unit of 2N×2N and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a smallest encoding error.

The video encoding apparatus 100 may also perform the transformation on the image data in a coding unit based not only on the coding unit for encoding the image data, but also based on a data unit that is different from the coding unit.

In order to perform frequency transformation in the coding unit, the frequency transformation may be performed based on a data unit having a size less than or equal to the coding unit. For example, the data unit for frequency transformation may include a data unit for an intra mode and a data unit for an inter mode.

Hereinafter, a data unit which is the basis for frequency transformation may be referred to as a 'transformation unit.' Similar to the coding unit, the transformation unit in the coding unit may be recursively split into smaller sized transformation units, and thus, residual data in the coding unit may be divided according to the transformation unit having a tree structure according to transformation depths.

A transformation depth indicating a number of times splitting is performed to reach the transformation unit by splitting the height and width of the coding unit may also be set in the transformation unit according to an exemplary embodiment. For example, in a current coding unit of 2N×2N, a transformation depth may be 0 when the size of a transformation unit is 2N×2N, may be 1 when the size of a transformation unit is N×N, and may be 2 when the size of a transformation unit is N/2×N/2. That is, the transformation unit having the tree structure may also be set according to transformation depths.

Encoding information according to coding units corresponding to a coded depth requires not only information about the coded depth but also about information related to prediction and transformation. Accordingly, the coding unit determiner 120 not only determines a coded depth having a smallest encoding error but also determines a partition type in a prediction unit, a prediction mode according to prediction units, and a size of a transformation unit for transformation.

Coding units having a tree structure in a maximum coding unit and a method of determining a coding unit and a partition according to an exemplary embodiment will be described in detail later with reference to FIGS. 3 through 12.

The coding unit determiner 120 may measure an encoding error of deeper coding units according to depths by using Rate-Distortion (RD) Optimization based on Lagrangian multiplier.

The output unit 130 outputs the image data of the maximum coding unit, which is encoded based on the at least one coded depth determined by the coding unit determiner 120, and information about the encoding mode according to the coded depth, in a bitstream.

The encoded image data may be obtained by encoding residual data of an image.

The information about the encoding mode according to coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, the encoding is performed on the current coding unit of the current depth, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Because at least one coding unit of the lower depth exists in one coding unit of the current depth, the encoding is repeatedly performed on each coding unit of the lower depth, and thus the encoding may be recursively performed for the coding units having the same depth.

Because the coding units having a tree structure are determined for one maximum coding unit and information about at least one encoding mode is determined for a coding unit of a coded depth, information about at least one encoding mode may be determined for one maximum coding unit. Also, a coded depth of the data of the maximum coding unit may be different according to locations because the data is hierarchically split according to depths, and thus information about the coded depth and the encoding mode may be set for the data.

Accordingly, the output unit 130 may assign encoding information about a corresponding coded depth and an encoding mode to at least one of the coding unit, the prediction unit, and a minimum unit included in the maximum coding unit.

The minimum unit is a rectangular data unit obtained by splitting the minimum coding unit constituting a lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to deeper coding units according to depths, and encoding information according to prediction units. The encoding information according to the deeper coding units according to depths may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of a coding unit defined for each picture, slice or group of pictures (GOP) and information about a maximum depth may be inserted into a header of a bitstream.

In the video encoding apparatus 100, the deeper coding unit is a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum number of 4 coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, because encoding may be performed on each maximum coding unit by using any one of various prediction modes and transformations, an optimum encoding mode may be determined considering image characteristics of the coding unit of various image sizes.

Thus, if an image having high resolution or a large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased because a coding unit is adjusted while considering characteristics of an image while increasing a maximum size of a coding unit while considering a size of the image.

Figure 2:
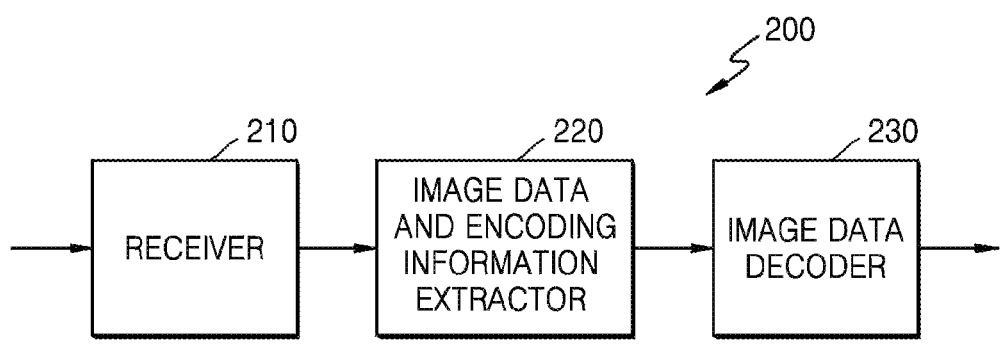
FIG. 2 is a block diagram of a video decoding apparatus based on coding units having a tree structure, according to an exemplary embodiment.

FIG. 2 is a block diagram of a video decoding apparatus 200 based on coding units having a tree structure, according to an exemplary embodiment.

The video decoding apparatus 200 includes a receiver 210, an image data and encoding information extractor 220, and an image data decoder 230. Hereinafter, definitions of terms, such as a coding unit, a depth, a prediction unit, a transformation unit, information about various encoding modes, are the same as those described with reference to FIG. 1 and the video encoding apparatus 100.

The receiver 210 receives and parses a bitstream of an encoded video. The image data and encoding information extractor 220 extracts encoded image data for each coding unit from the parsed bitstream, the coding units have a tree structure according to each maximum coding unit, and outputs the extracted image data to the image data decoder 230. The image data and encoding information extractor 220 may extract information about a maximum size of a coding unit of a current picture, from a header about the current picture.

Also, the image data and encoding information extractor 220 extracts information about a coded depth and an encoding mode for the coding units having the tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coded depth, and information about an encoding mode according to each coded depth may include information about a partition type of a corresponding coding unit, a prediction mode, and a size of a transformation unit. Also, split information according to depths may be extracted as the information about the coded depth.

The information about the coded depth and the encoding mode according to each maximum coding unit extracted by the image data and encoding information extractor 220 is information about a coded depth and an encoding mode determined to generate a smallest encoding error when an encoder, such as the video encoding apparatus 100, repeatedly performs encoding for each deeper coding unit according to depths according to each maximum coding unit. Accordingly, the video decoding apparatus 200 may reconstruct an image by decoding the data according to an encoding mode that generates the smallest encoding error.

Because encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. When the information about the coded depth of the corresponding maximum coding unit and the encoding mode is recorded according to the predetermined data units, the predetermined data units having the same information about the coded depth and the encoding mode may be inferred to be the data units included in the same maximum coding unit.

The image data decoder 230 reconstructs the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse frequency transformation based on each transformation unit in the coding unit to perform the inverse frequency transformation according to maximum coding units.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data of the current depth by using the information about the partition type of the prediction unit, the prediction mode, and the size of the transformation unit for image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about a coding unit that generates the smallest encoding error when encoding is recursively performed for each maximum coding unit, and may use the information to decode the current picture. In other words, encoded image data of the coding units having the tree structure determined to be the optimum coding units in each maximum coding unit may be decoded.

Accordingly, even if image data has high resolution and a large amount of data, the image data may be efficiently decoded and reconstructed according to a size of a coding unit and an encoding mode, which are adaptively determined according to characteristics of an image, by using information about an optimum encoding mode received from an encoder.

Hereinafter, a method of determining coding units having a tree structure, prediction units, and transformation units according to an exemplary embodiment of the inventive concept will be described with reference to FIGS. 3 through 13.

Figure 3:
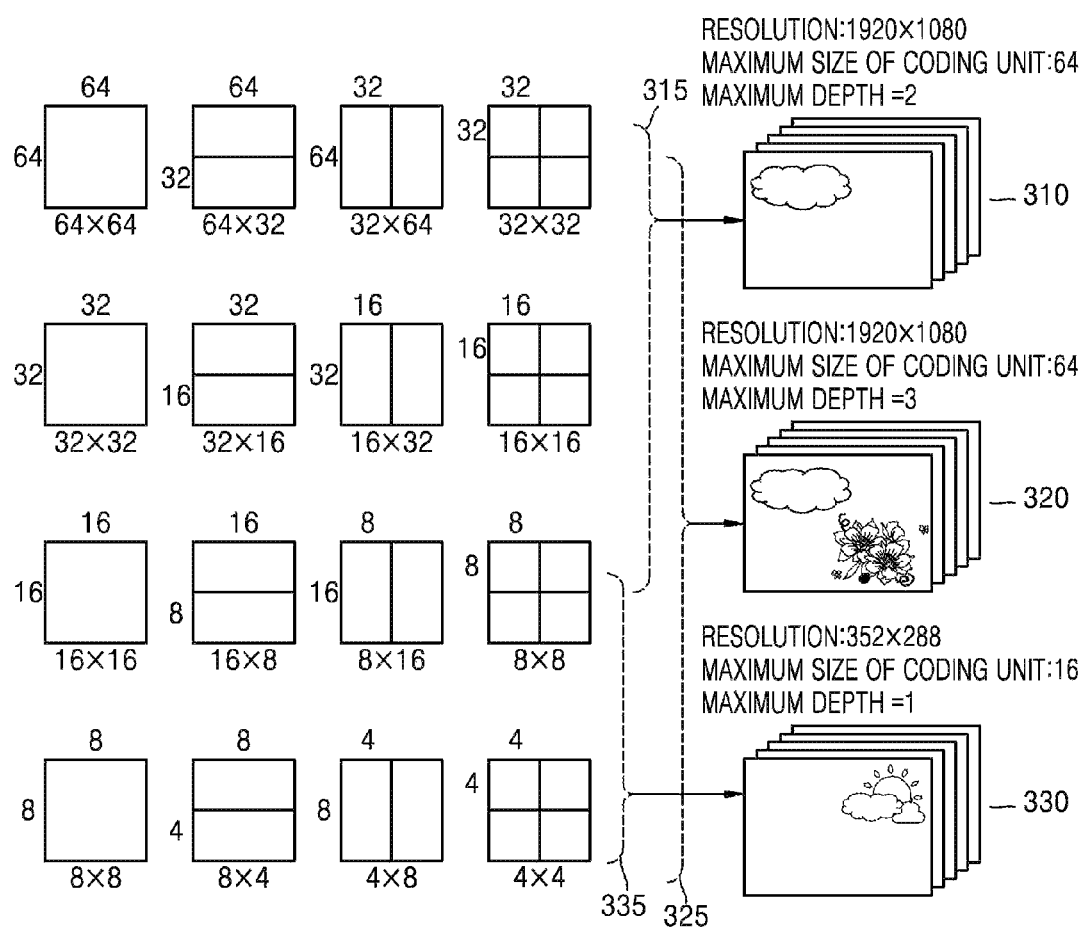
FIG. 3 is a diagram for describing a concept of coding units according to an exemplary embodiment.

FIG. 3 is a diagram for describing a concept of hierarchical coding units.

A size of a coding unit may be expressed in width×height, and examples of the size of the coding unit may include 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is set to 1920×1080, a maximum size of a coding unit is set to 64, and a maximum depth is set to 2. In video data 320, a resolution is set to 1920×1080, a maximum size of a coding unit is set to 64, and a maximum depth is set to 3. In video data 330, a resolution is set to 352×288, a maximum size of a coding unit is set to 16, and a maximum depth is set to 1. The maximum depth shown in FIG. 3 denotes a total number of splits from a maximum coding unit to a minimum decoding unit.

If a resolution is high or a data amount is large, a maximum size of a coding unit may be large to not only increase encoding efficiency but also to accurately reflect characteristics of an image. Accordingly, the maximum size of the coding unit of the video data 310 and 320 having the higher resolution than the video data 330 may be 64.

Because the maximum depth of the video data 310 is 2, coding units 315 of the video data 310 may include a maximum coding unit having a long axis size of 64, and coding units having long axis sizes of 32 and 16 because depths are increased to two layers by splitting the maximum coding unit twice. Meanwhile, because the maximum depth of the video data 330 is 1, coding units 335 of the video data 330 may include a maximum coding unit having a long axis size of 16, and coding units having a long axis size of 8 because depths are increased to one layer by splitting the maximum coding unit once.

Because the maximum depth of the video data 320 is 3, coding units 325 of the video data 320 may include a maximum coding unit having a long axis size of 64, and coding units having long axis sizes of 32, 16, and 8 because the depths are increased to 3 layers by splitting the maximum coding unit three times. As a depth increases, detailed information may be more precisely expressed.

Figure 4:
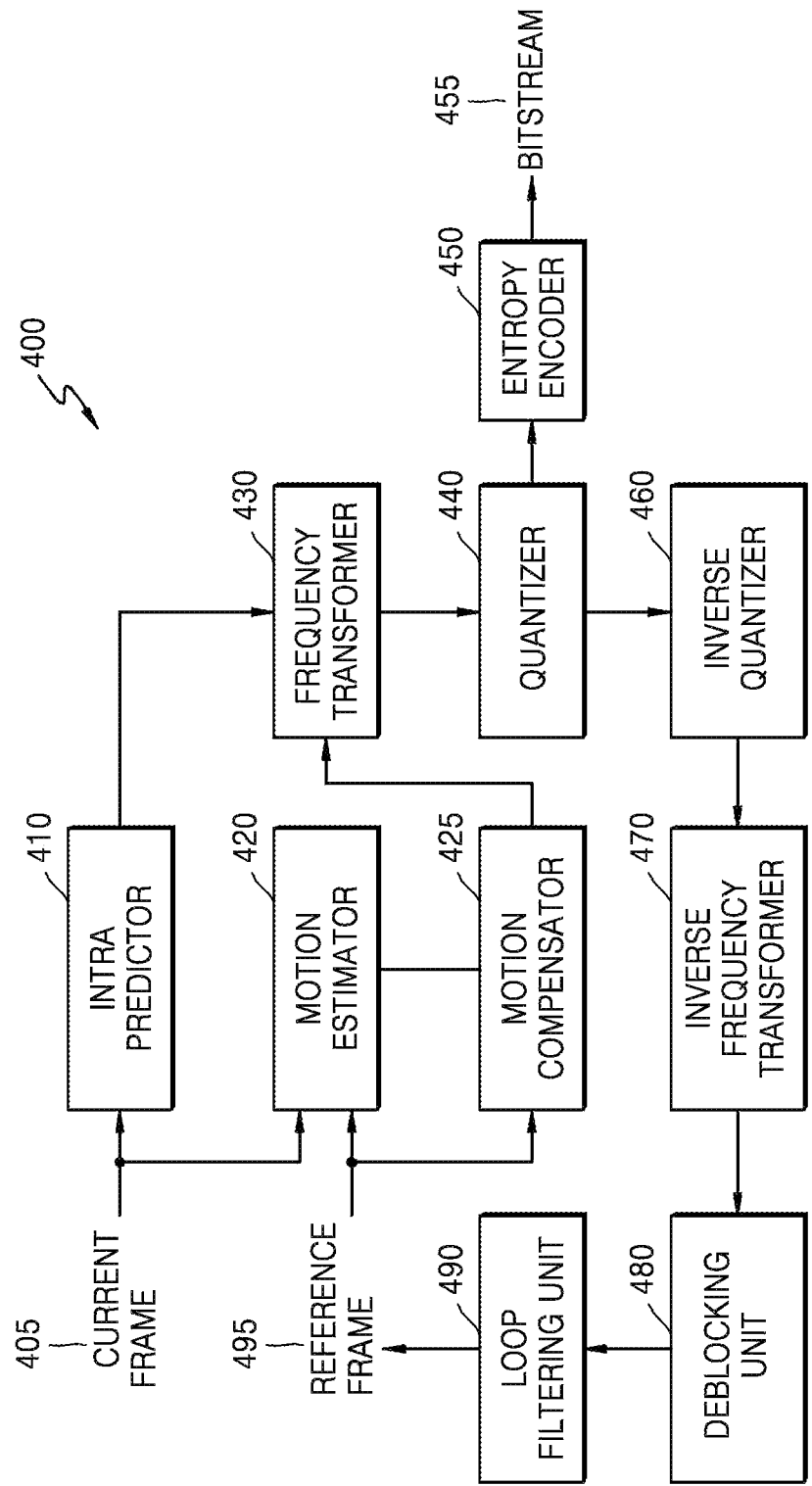
FIG. 4 is a block diagram of an image encoder based on coding units, according to an exemplary embodiment.

FIG. 4 is a block diagram of an image encoder based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 perform inter estimation and motion compensation on coding units in an inter mode from among the current frame 405 by using the current frame 405 and a reference frame 495.

Data output from the intra predictor 410, the motion estimator 420, and the motion compensator 425 is output as a quantized transformation coefficient through a frequency transformer 430 and a quantizer 440. Specifically, when performing bilateral motion prediction and compensation, the motion estimator 420 and the motion compensator 425 perform bilateral motion compensation in pixel units in addition to a result obtained by performing bilateral motion prediction and compensation based on blocks. This will be described in detail with reference to FIG. 14.

The quantized transformation coefficient is reconstructed to data in a spatial domain through an inverse quantizer 460 and an inverse frequency transformer 470, and the reconstructed data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the frequency transformer 430, the quantizer 440, the entropy encoder 450, the inverse quantizer 460, the inverse frequency transformer 470, the deblocking unit 480, and the loop filtering unit 490 have to perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having the tree structure while considering the maximum size and the maximum depth of a current maximum coding unit, and the frequency transformer 430 determines the size of the transformation unit in each coding unit from among the coding units having the tree structure.

Figure 5:
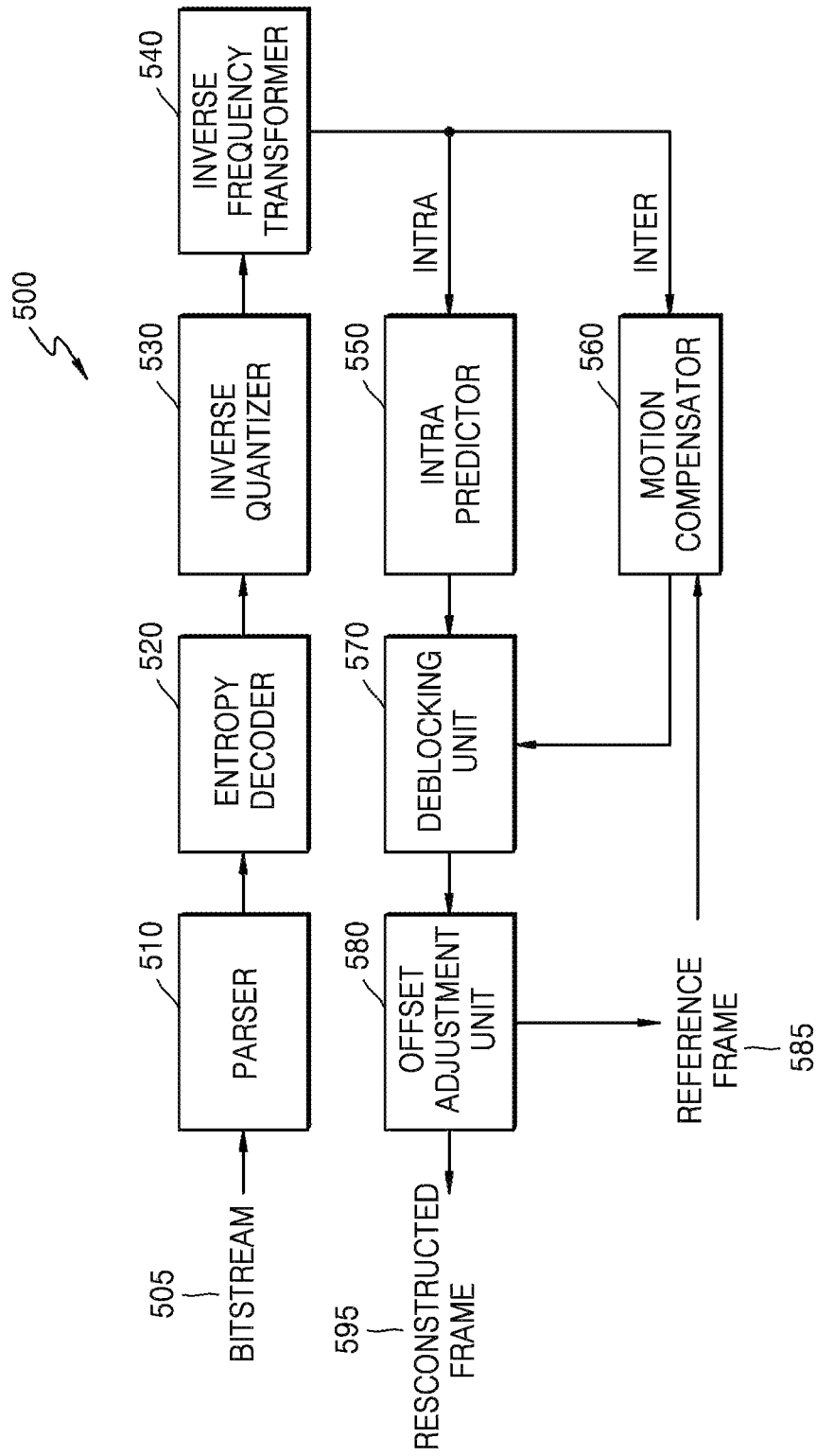
FIG. 5 is a block diagram of an image decoder based on coding units, according to an exemplary embodiment.

FIG. 5 is a block diagram of an image decoder based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is reconstructed to image data in a spatial domain through an inverse frequency transformer 540.

An intra predictor 550 performs intra prediction on coding units in an intra mode with respect to the image data in the spatial domain, and a motion compensator 560 performs motion compensation on coding units in an inter mode by using a reference frame 585. Specifically, the motion compensator 560 performs bilateral motion compensation in pixel units in addition to a result obtained by performing bilateral motion compensation based on blocks when performing bilateral motion compensation. This will be described in detail with reference to FIG. 14.

The data in the spatial domain, which passed through the intra predictor 550 and the motion compensator 560, may be output as a reconstructed frame 595 after being post-processed through a deblocking unit 570 and a loop filtering unit 580. Also, the data, which is post-processed through the deblocking unit 570 and the loop filtering unit 580, may be output as the reference frame 585.

In order to decode the image data in the image data decoder 230 of the video decoding apparatus 200, the image decoder 500 may perform operations that are performed after operations of the parser 510 are performed.

In order for the image decoder 500 to be applied in the video decoding apparatus 200, all elements of the image decoder 500, i.e., the parser 510, the entropy decoder 520, the inverse quantizer 530, the inverse frequency transformer 540, the intra predictor 550, the motion compensator 560, the deblocking unit 570, and the loop filtering unit 580 perform operations based on coding units having a tree structure for each maximum coding unit.

Specifically, the intra predictor 550 and the motion compensator 560 determine partitions and a prediction mode for each of the coding units having the tree structure, and the inverse frequency transformer 540 determines a size of a transformation unit for each coding unit.

Figure 6:
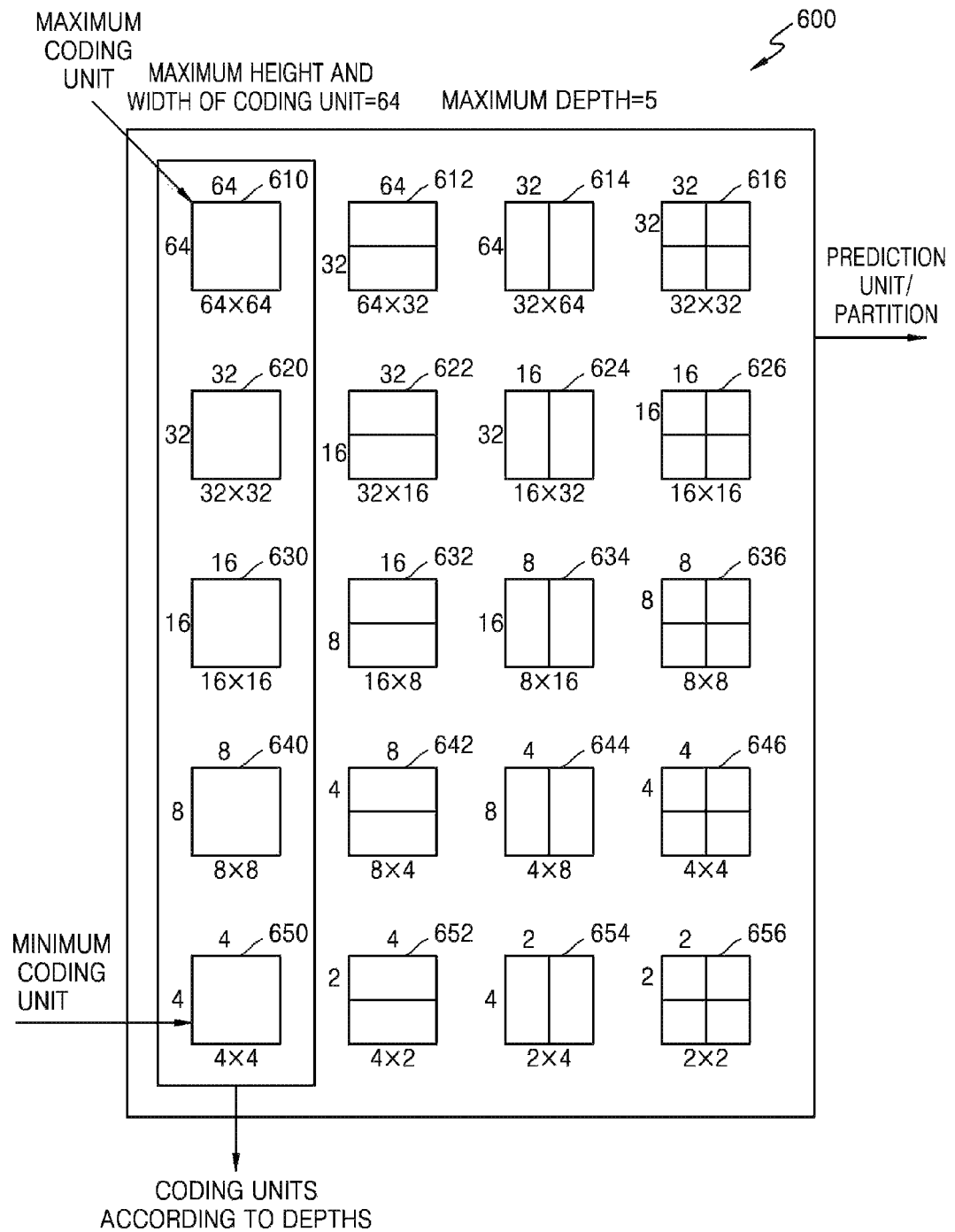
FIG. 6 is a diagram illustrating coding units according to depths and partitions, according to an exemplary embodiment.

FIG. 6 is a diagram illustrating coding units according to depths and partitions, according to an exemplary embodiment.

The video encoding apparatus 100 and the video decoding apparatus 200 use hierarchical coding units to consider characteristics of an image. A maximum height, a maximum width, and a maximum depth of coding units may be adaptively determined according to the characteristics of the image, or may be differently set by a user. Sizes of deeper coding units according to depths may be determined according to the maximum size of the coding unit which is previously set.

In a hierarchical structure 600 of coding units, the maximum height and the maximum width of the coding units are each 64, and the maximum depth is 4. Because a depth increases along a vertical axis of the hierarchical structure 600 of the coding units according to an exemplary embodiment, a height and a width of the deeper coding unit are each split. Also, a prediction unit and partitions, which are bases for prediction encoding of each deeper coding unit, are shown along a horizontal axis of the hierarchical structure 600 of the coding units.

In other words, a coding unit 610 is a maximum coding unit in the hierarchical structure 600 of the coding units, wherein a depth is 0 and a size, i.e., a height by width, is 64×64. The depth increases along the vertical axis, and a coding unit 620 having a size of 32×32 and a depth of 1, a coding unit 630 having a size of 16×16 and a depth of 2, a coding unit 640 having a size of 8×8 and a depth of 3, a coding unit 650 having a size of 4×4 and a depth of 4. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the coding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

Finally, the coding unit 650 having the size of 4×4 and the depth of 4 is the minimum coding unit and a coding unit of a lowermost depth, and a prediction unit thereof may also be set to a partition 650 having a size of 4×4.

In order to determine a coded depth of the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth increases. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 have to be each encoded.

In order to perform encoding according to each depth, a representative encoding error that is a smallest encoding error in the corresponding depth may be selected by performing encoding for each prediction unit in the deeper coding units, along the horizontal axis of the hierarchical structure 600 of the coding units. Alternatively, the smallest encoding error may be searched for by comparing representative encoding errors according to depths by performing encoding for each depth as the depth increases along the vertical axis of the hierarchical structure 600 of the coding units. A depth and a partition having the smallest encoding error in the maximum coding unit 610 may be selected as the coded depth and a partition type of the maximum coding unit 610.

FIG. 7 is a diagram for describing a relationship between a coding unit 710 and transformation units 720, according to an exemplary embodiment.

The video encoding apparatus 100 or the video decoding apparatus 200 encodes or decodes an image according to coding units having sizes less than or equal to a maximum coding unit for each maximum coding unit. Sizes of transformation units for frequency transformation during encoding may be selected based on data units that are not larger than a corresponding coding unit.

For example, in the video encoding apparatus 100 or the video decoding apparatus 200, if a size of the current coding unit 710 is 64×64, frequency transformation may be performed by using the transformation units 720 having a size of 32×32.

Also, data of the coding unit 710 having the size of 64×64 may be encoded by performing the frequency transformation on each of the transformation units having the size of 32×32, 16×16, 8×8, and 4×4, which are smaller than 64×64, and then a transformation unit having a smallest error with respect to the original may be selected.

FIG. 8 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 about the partition type indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition type of the current coding unit is set to indicate one of the partition 804 having a size of 2N×N, the partition 806 having a size of N×2N, and the partition 808 having a size of N×N.

The information 810 about the prediction mode indicates a prediction mode of each partition. For example, the information 810 about the prediction mode may indicate a mode of prediction encoding performed on a partition indicated by the information 800, i.e., an intra mode 812, an inter mode 814, or a skip mode 816.

Also, the information 820 about the size of the transformation unit indicates a transformation unit to be based on when frequency transformation is performed on a current coding unit. For example, the transformation unit may be a first intra transformation unit 822, a second intra transformation unit 824, a first inter transformation unit 826, or a second intra transformation unit 828.

The image data and encoding information extractor 210 of the video decoding apparatus 200 may extract and use the information 800 about the partition type, the information 810 about the prediction mode, and the information 820 about the size of the transformation unit for decoding according to each deeper coding unit.

Figure 9:
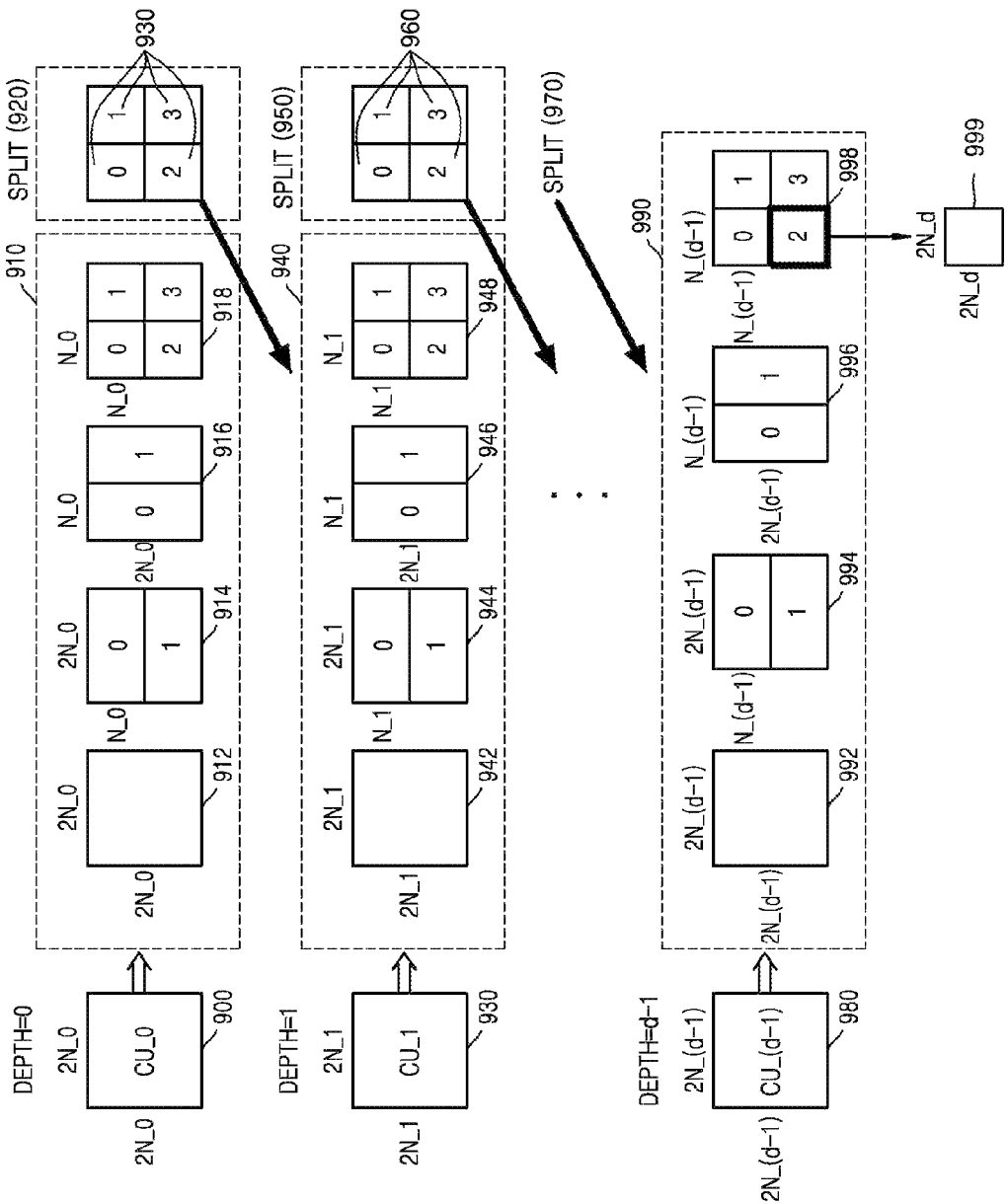
FIG. 9 is a diagram of coding units according to depths according to an exemplary embodiment.

FIG. 9 is a diagram of coding units according to depths according to an exemplary embodiment.

Split information may be used to indicate a change of a depth. The spilt information indicates whether a coding unit of a current depth is split into coding units of a lower depth.

A prediction unit 910 for prediction encoding of a coding unit CU_0 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0.

FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding has to be repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2 N_0×N_0, and N_0×N_0. The prediction encoding in a skip mode may be performed only on the partition having the size of 2N_0×2N_0.

If an encoding error is smallest in one of the partition types 912 through 916 having the sizes of 2N_0×2N_0, 2N_0×N_0, and N_0×2N_0, the prediction unit 910 may be no longer split to a lower depth.

If the encoding error is the smallest in the partition type 918 having the size of N_0×N_0, a depth may be changed from 0 to 1 to split the partition type 918 in operation 920, and encoding may be repeatedly performed on coding units CU_1 930 having a depth of 2 and a size of N_0×N_0 to search for a smallest encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth may be changed from 1 to 2 to split the partition type 948 in operation 950, and encoding may be repeatedly performed on coding units 960, which have a depth of 2 and a size of N_2×N_2 to search for a smallest encoding error.

When a maximum depth is d, split information according to each depth may be set until a depth becomes d−1, and split information may be set until a depth becomes d−2. In other words, when encoding is performed until the depth is d−1 after a coding unit corresponding to a depth of d−2 is split in operation 970, a prediction unit 990 for prediction encoding a coding unit CU_(d−1) 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a smallest encoding error.

Even when the partition type 998 having the size of N_(d−1)×N_(d−1) has the smallest encoding error, because a maximum depth is d, a coding unit CU_(d−1) having a depth of d−1 may be no longer split to a lower depth, a coded depth for a current maximum coding unit 900 may be determined to be d−1, and a partition type of the current maximum coding unit 900 may be determined to be N_(d−1)×N_(d−1). Also, because the maximum depth is d, split information for a coding unit 952 having a depth of d−1 is not set.

A data unit 999 may be referred to as a 'minimum unit' for the current maximum coding unit. A minimum unit may be a rectangular data unit obtained by splitting a minimum coding unit having a lowermost coded depth by 4. By performing the encoding repeatedly, the video encoding apparatus 100 may select a depth having a smallest encoding error by comparing encoding errors according to depths of the coding unit 900 to determine a coded depth, and may set a corresponding partition type and a prediction mode as an encoding mode of the coded depth.

As such, the smallest encoding errors according to depths are compared in all of the depths of 0, 1, . . . , d, and a depth having the smallest encoding error may be determined as a coded depth. The coded depth, the partition type of the prediction unit, and the prediction mode may be encoded and transmitted as information about an encoding mode. Also, because a coding unit has to be split from a depth of 0 to the coded depth, only split information of the coded depth has to be set to 0, and split information of depths excluding the coded depth has to be set to 1.

The image data and encoding information extractor 220 of the video decoding apparatus 200 may extract and use the information about the coded depth and the prediction unit of the coding unit 900 to decode the coding unit 912. The video decoding apparatus 200 may determine a depth, in which split information is 0, as a coded depth by using split information according to depths, and may use information about an encoding mode of the corresponding depth for decoding.

Figure 10:
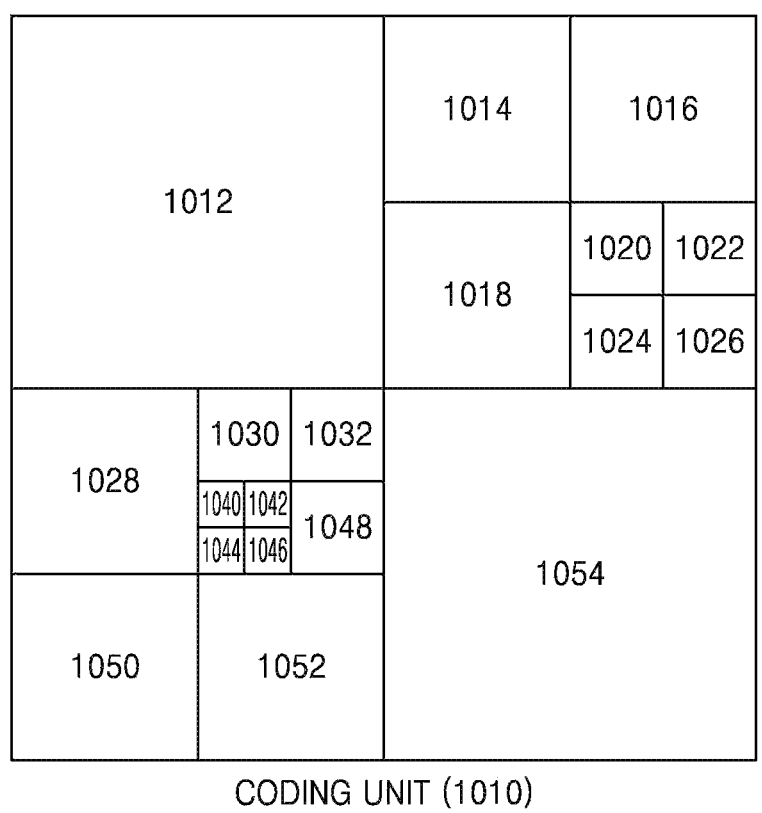
FIGS. 10 through 12 are diagrams for describing a relationship between coding units, prediction units, and transformation units, according to an exemplary embodiment.
Figure 11:
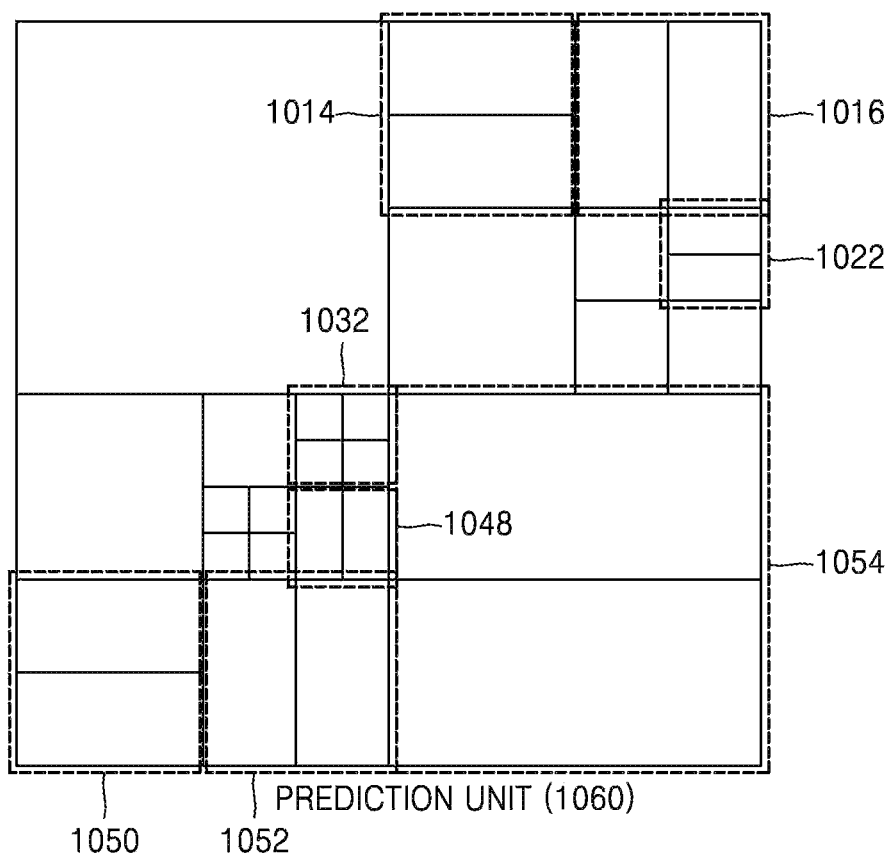
Figure 12:
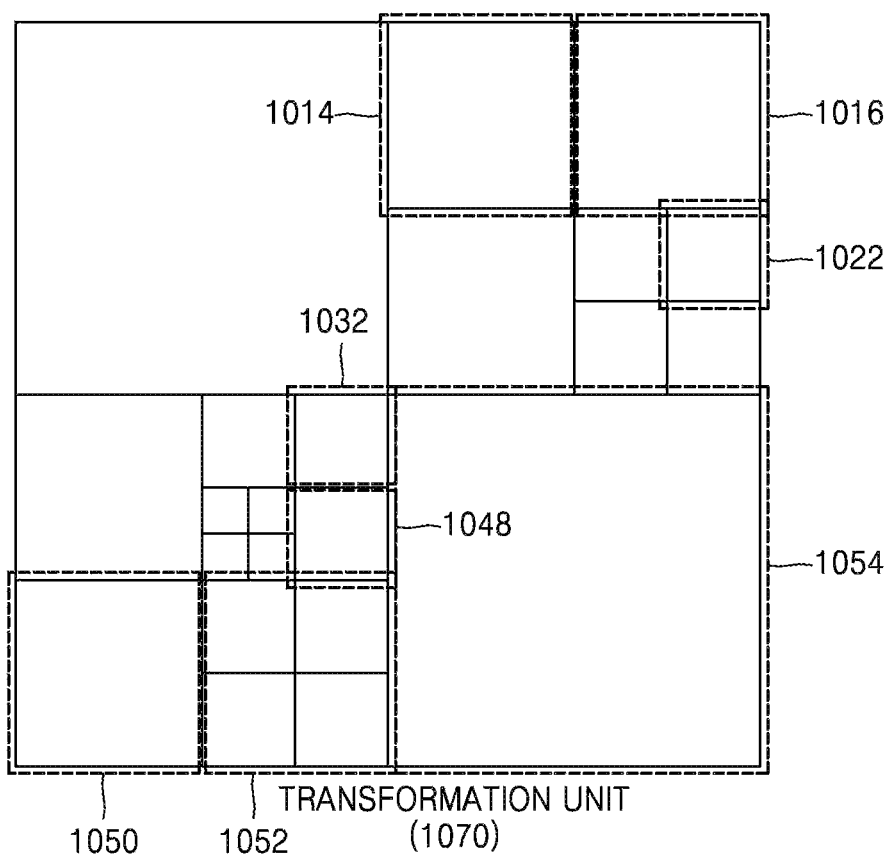

FIGS. 10 through 12 are diagrams for describing a relationship between coding units, prediction units, and frequency transformation units, according to an exemplary embodiment.

As illustrated in FIG. 10, coding units 1010 are coding units corresponding to coded depths determined by the video encoding apparatus 100, in a maximum coding unit. The prediction units 1060 are partitions of prediction units of each of the coding units 1010, and the transformation units 1070 are transformation units of each of the coding units.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

As illustrated in FIG. 11, the prediction units 1060, some partitions 1014, 1016, 1022, 1032, 1048, 1050, 1052, and 1054 are obtained by splitting the coding units. In other words, partition types in the partitions 1014, 1022, 1050, and 1054 have a size of 2N×N, partition types in the partitions 1016, 1048, and 1052 have a size of N×2N, and a partition type of the partition 1032 has a size of N×N. Prediction units and partitions of the coding units 1010 are smaller than or equal to each coding unit.

As illustrated in FIG. 12, frequency transformation or inverse frequency transformation is performed on image data of the transformation unit 1052 in the transformation units 1070 in a data unit that is smaller than the transformation unit 1052. Also, the transformation units 1014, 1016, 1022, 1032, 1048, 1050, 1052, and 1054 are different from those in the prediction units 1060 in terms of sizes or shapes. In other words, the video encoding apparatus 100 and the video decoding apparatus 200 may perform intra prediction/motion estimation/motion compensation, and frequency transformation/inverse frequency transformation individually on a data unit even in the same coding unit.

Accordingly, encoding may be recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding apparatus 100 and the video decoding apparatus 200 t.

TABLE 1

Split Information 0
(Encoding on Coding Unit having Size of 2N × 2N and Current Depth of d)

| Prediction Mode | Partition Type | | Size of Transformation Unit | | Split Information 1 |
| --- | --- | --- | --- | --- | --- |
| | Symmetrical Partition Type | Asymmetrical Partition Type | Split Information 0 of Transformation Unit | Split Information 1 of Transformation Unit | |
| Intra Inter | 2N × 2N 2N × N | 2N × nU 2N × nD | 2N × 2N | N × N (Symmetrical | Repeatedly Encode |

TABLE 1-continued

Split Information 0
(Encoding on Coding Unit having Size of
2N × 2N and Current Depth of d)

| | Partition Type | | Size of Transformation Unit | | |
|---|---|---|---|---|---|
| Prediction Mode | Symmetrical Partition Type | Asymmetrical Partition Type | Split Information 0 of Transformation Unit | Split Information 1 of Transformation Unit | Split Information 1 |
| Skip (Only 2N × 2N) | N × 2N<br>N × N | nL × 2N<br>nR × 2N | | Type) N/2 × N/2 (Asymmetrical Type) | Coding Units having Lower Depth of d + 1 |

The output unit 130 of the video encoding apparatus 100 may output the encoding information about the coding units having the tree structure, and the image data and encoding information extractor 220 of the video decoding apparatus 200 may extract the encoding information about the coding units having the tree structure from a received bitstream.

Split information indicates whether a current coding unit is split into coding units of a lower depth. If split information of a current depth d is 0, a depth, in which a current coding unit is no longer split to a lower depth, is a coded depth, and thus information about a partition type, a prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD are respectively obtained by splitting the height of the prediction unit in 1:3 and 3:1, and the asymmetrical partition types having the sizes of nL×2N and nR×2N are respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit is set to 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be set to N×N, and if the partition type of the current coding unit is an asymmetrical partition type, the size of the transformation unit may be set to N/2×N/2.

The encoding information about coding units having a tree structure, according to an exemplary embodiment, may be assigned to at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth may be determined by using encoding information of a data unit, and thus a distribution of coded depths in a maximum coding unit may be determined.

Accordingly, if a current coding unit is predicted by referring to adjacent data units, encoding information of data units in deeper coding units adjacent to the current coding unit may be directly referred to and used.

Alternatively, if a current coding unit is prediction encoded by referring to neighboring data units, data units adjacent to the current coding unit in deeper coding units may be searched for by using encoded information of the data units, and the searched adjacent coding units may be referred to for prediction encoding the current coding unit.

Figure 13:
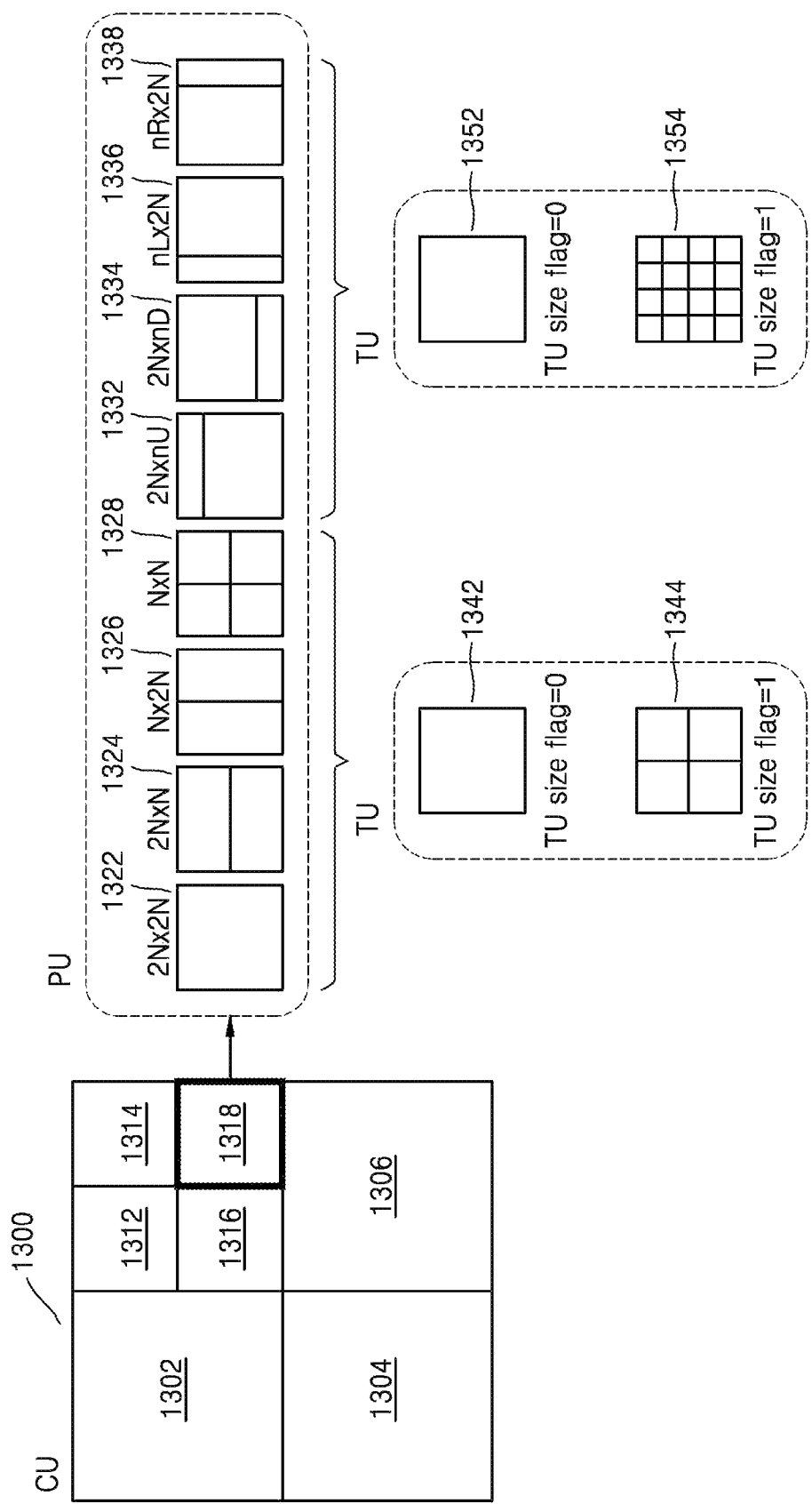
FIG. 13 is a diagram for describing a relationship between a coding unit, a prediction unit, and a transformation unit, according to the encoding mode information of Table 1.

FIG. 13 is a diagram for describing a relationship between a coding unit, a prediction unit, and a transformation unit, according to the encoding mode information of Table 1.

A maximum coding unit (CU) 1300 includes coding units 1302, 1304, 1306, 1312, 1314, 1316, and 1318 of coded depths. Here, because the coding unit 1318 is a coding unit of a coded depth, split information may be set to 0. Information about a partition type (e.g., partition unit PU) of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

For example, when the partition type is set to be symmetrical, i.e. the partition type 1322, 1324, 1326, or 1328, a transformation unit 1342 having a size of 2N×2N is set if split information (TU size flag) of a transformation unit (TU) is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

The maximum coding unit including coding units having a tree structure described with reference to FIGS. 1 through 13 may be referred to variously as a coding block tree, a block tree, a root block tree, a coding tree, a coding root, or a tree trunk.

A method and apparatus for encoding a multilayer video and a method and apparatus for decoding a multilayer video will be described with reference to FIGS. 14 through 22. Hereinafter, the term 'image' may refer to a still image or a moving picture, that is, a video itself. Also, an encoding order is an order according to which images are processed on an encoder side, and a decoding order is an order according to which images are processed on a decoder side. The encoding order and the decoding order are identical.

Figure 14:
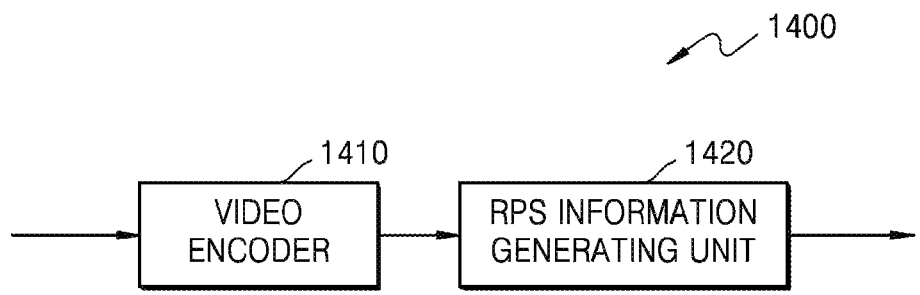
FIG. 14 is a block diagram of a multilayer video decoding apparatus according to an exemplary embodiment.

FIG. 14 is a block diagram of a multilayer video decoding apparatus according to an exemplary embodiment.

Referring to FIG. 14, the multilayer video encoding apparatus 1400 includes a video encoder 1410 and a reference picture set (RPS) information generating unit 1420.

The video encoder 1410 receives and encodes a multilayer video. The video encoder 1410 corresponds to a video coding layer handling encoding of the input video itself.

As described above with reference to FIGS. 1 through 13, the video encoder 1410 splits each picture included in a multilayer video into maximum coding units each having a maximum size, splits each of the split maximum coding units into coding units again, and encodes each picture based on the coding units. The coding units have a tree structure in which the maximum coding units are hierarchically split according to depths. The video encoder 1410 performs prediction on the coding units by using a prediction unit and transforms the coding units by using a residual, which is a difference between a prediction value and an original signal.

A multilayer video may be a multi-view video or a scalable video. When the multilayer video is multi-view video, the video encoder 1410 encodes each of n (where n is an integer) image sequences as one layer. When the multilayer video is a scalable video, the video encoder 1410 encodes each of an image sequence of a base layer and image sequences of an enhancement layer.

The multilayer video has a larger amount of data than data of single layer video. Thus, the video encoder 1410 may perform prediction encoding by using a correlation between images of respective layers included in the multilayer video. In other words, the video encoder 1410 may prediction encode images of respective layers by referring to images of other layers. A prediction process performed by referring to an image of other layers that is different from an image of a current layer is defined as interlayer prediction.

As an example, the video encoder 1410 may perform inter-view prediction for predicting additional view images with reference to base view images. Also, the video encoder 1410 may perform inter-view prediction for predicting other additional view images with reference to predetermined additional view images. According to the inter-view prediction, a disparity between a current image and a reference image and a residual which is a difference component between the current image and the reference image may be generated. As described above, interlayer prediction may be performed based on a coding unit having a tree structure, a prediction unit, or a transformation unit.

The video encoder 1410 may perform inter prediction and intra prediction within an image of the same layer, or may determine a relationship between pictures included in a multilayer via interlayer prediction, in which images of other layers are used. Also, the video encoder 1410 may perform encoding by transforming and quantizing a difference between a prediction value generated through inter prediction, intra prediction and interlayer prediction, and an original signal. Through such an encoding process in a video coding layer (VCL), the video encoder 1410 outputs residual information related to a coding unit, prediction mode information, and additional information related to prediction encoding of the coding unit.

Figure 18:
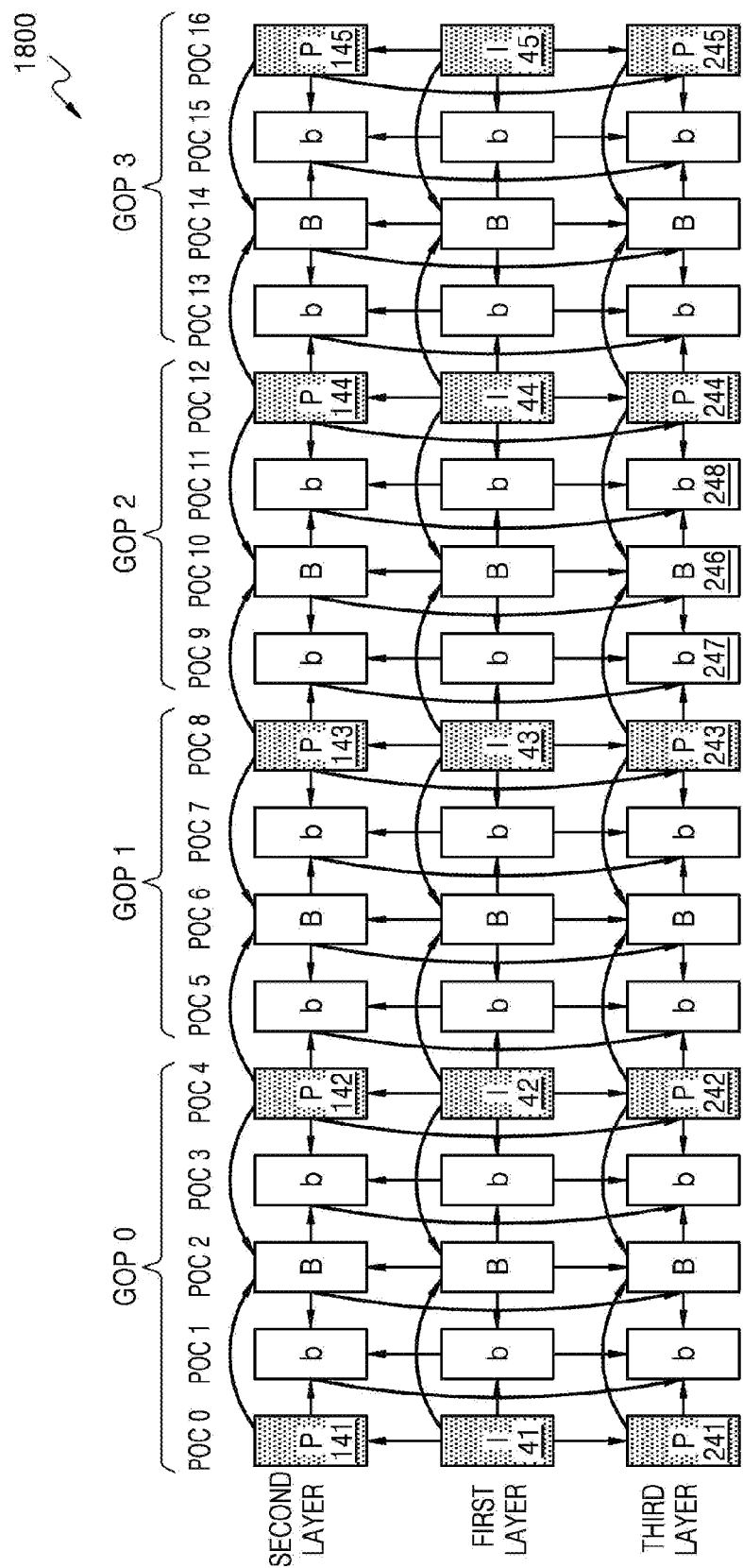
FIG. 18 illustrates an example of an interlayer prediction structure according to an exemplary embodiment.

FIG. 18 illustrates an example of an interlayer prediction structure according to an exemplary embodiment.

As described above, the multilayer video encoding apparatus 1400 may perform interlayer prediction, in which pictures of other layers are referred to when prediction encoding pictures of respective layers. For example, the interlayer prediction structure 1800 of FIG. 18 denotes a prediction structure for prediction encoding of stereoscopic image sequences consisting of a first layer image of a center view, a second layer image of a left view, and a third layer image of a right view. In FIG. 18, an arrow denotes a reference direction of each picture. For example, an I picture 41 of a first layer is used as a reference picture for a P picture 141 of a second layer and a P picture 241 of a third layer. Also, images having a same POC order are arranged vertically. A POC order of an image indicates an output order or a reproduction order of pictures constituting a video. In the interlayer prediction structure 1800, 'POC #' indicates a relative output order of pictures positioned in a corresponding column. Four consecutive images of view images constitute a single group of pictures (GOP) for each view. Each GOP includes images between consecutive anchor pictures and a single key picture. The number and configuration of images included in a GOP may be modified.

The anchor picture is a random access point, and in this regard, when a predetermined reproduction position is selected from images that are arranged according to a reproduction order of video, that is, according to a POC order, an anchor picture of which a POC order is closest to the reproduction position is reproduced. First layer images include basic view anchor pictures 41, 42, 43, 44, and 45, second layer images include left-view anchor pictures 141, 142, 143, 144, and 145, and third layer images include right-view anchor pictures 241, 242, 243, 244, and 245. As illustrated in FIG. 18, interlayer prediction where not only pictures of the same layer but images of other layers are referred to may be performed on pictures included in a multilayer.

The video encoder 1410 encodes a random access point (RAP) picture that is set for random access from among pictures included in a multilayer, without performing interlayer prediction. Examples of RAP pictures are an instantaneous decoding refresh (IDR) picture, a clean random access (CRA) picture, a broken link access (BLA) picture, a temporal sublayer access (TSA) picture, and a stepwise temporal sublayer access (STSA) picture. The RAP picture is encoded by intra prediction without referring to other pictures. The video encoder 1410 may perform interlayer prediction only on pictures that are not RAP pictures (non-RAP pictures) from among pictures included in a multilayer. However, the RAP picture may be used as a reference picture for other layers.

The video encoder 1410 may determine a reference relationship between pictures included in a multilayer through intra prediction, inter prediction, and interlayer prediction. That is, the video encoder 1410 may determine which picture is referred to when prediction encoding each picture included in a multilayer. An optimum reference picture referred to by each picture may be determined based on rate-distortion cost or a reference relationship between input image sequences may be determined according to an encoding rule preset by the video encoder 1410.

In order for a decoder to reconstruct an image, information about a reference picture referred to by a picture encoded by inter prediction or interlayer prediction has to be transmitted. Thus, the RPS information generating unit 1420 generates RPS information about a reference picture referred to by each picture included in a multilayer and outputs the same. RPS information may be information indicating whether a picture that has been previously reconstructed and stored in a decoded picture buffer (DPB) is used as a reference picture for a current picture and pictures after the current picture. RPS information according to an exemplary embodiment includes first short-term RPS information (RefPicSetStCurrBefore), second short-term RPS information (RefPicSetStCurrAfter), third short-term RPS information (RefPicSetStFoll), first long-term RPS information (RefPicSetLtCurr), and second long-term RPS information (RefPicSetLtFoll). In particular, RPS information according to an exemplary embodiment further includes interlayer RPS information indicating a reference relationship in regard to interlayer prediction between pictures included in the same access unit (AU) and transmitted, by considering a reference relationship that is interlayer predicted in a multilayer video. Interlayer RPS information may include information indicating whether a picture that has a same POC as a current picture and is included in other layer, and is previously stored and stored in the DPB is used as a reference picture for interlayer prediction of the current picture. RPS information may be included in a slice header of each picture and transmitted. RPS information will be described in detail later.

Figure 15:
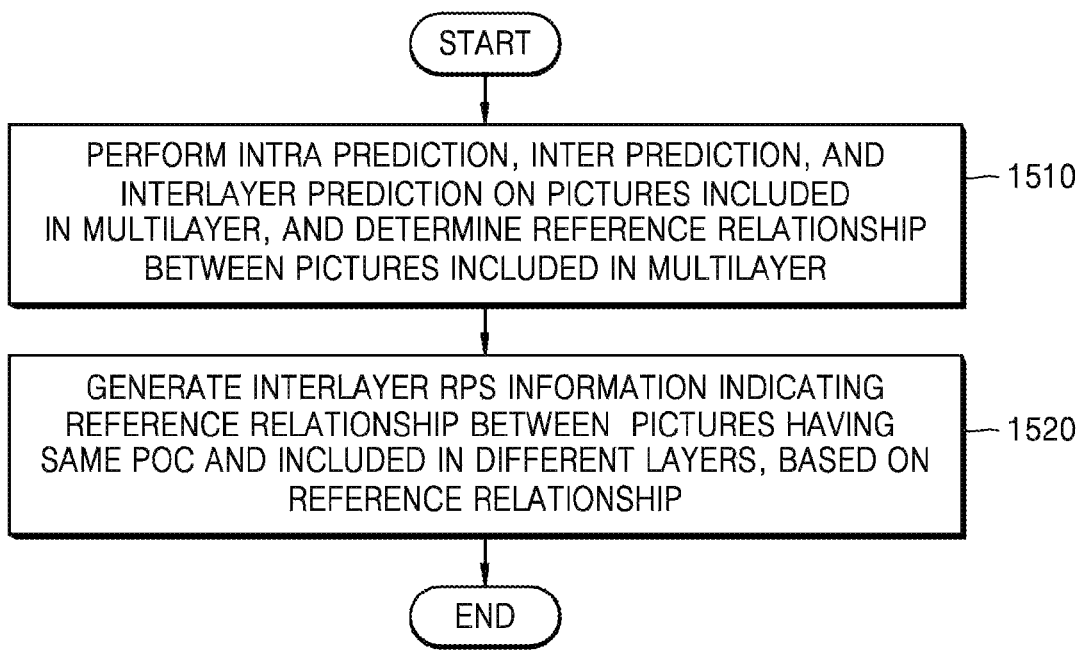
FIG. 15 is a flowchart of a multilayer video encoding method according to an exemplary embodiment.

FIG. 15 is a flowchart of a multilayer video encoding method according to an exemplary embodiment.

Referring to FIGS. 14 and 15, in operation 1510, the video encoder 1410 performs intra prediction, inter prediction, and interlayer prediction on pictures included in a multilayer, and determines a reference relationship between the pictures included in the multilayer.

In operation 1520, the RPS information generating unit 1420 generates and outputs RPS information which is reference picture information referred to by each picture based on the reference relationship between multilayer pictures, an encoding order, and an output order. As described above, RPS information of each picture may be included in a slice header of each picture and transmitted. The RPS information generating unit 1420 may generate first short-term RPS information (RefPicSetStCurrBefore), second short-term RPS information (RefPicSetStCurrAfter), third short-term RPS information (RefPicSetStFoll), first long-term RPS information (RefPicSetLtCurr), and second long-term RPS information (RefPicSetLtFoll) and add the same to a slice header of the current picture. Also, the RPS information generating unit 1420 may generate interlayer RPS information about a reference picture that has a same POC as a current picture and is included in other layer, and that is referred to during interlayer prediction of the current picture, and add the interlayer RPS information to a slice header of the current picture.

Figure 16:
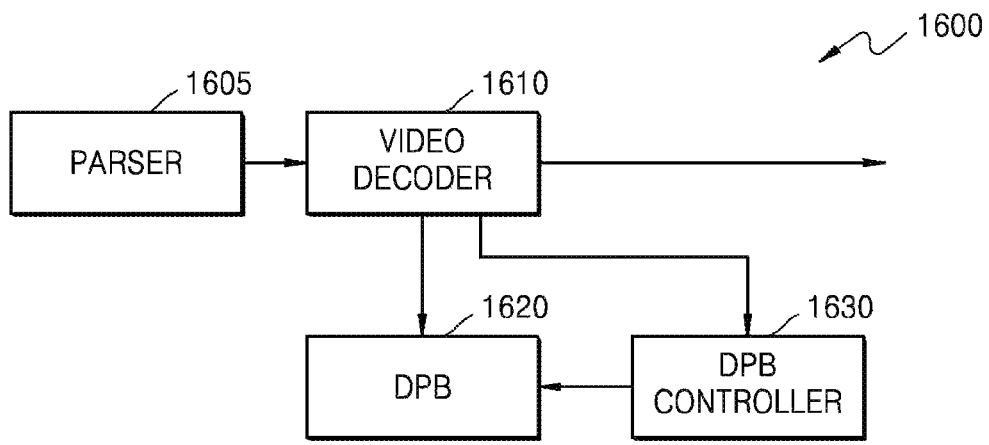
FIG. 16 is a block diagram illustrating a multilayer video decoding apparatus according to an exemplary embodiment.

FIG. 16 is a block diagram illustrating a multilayer video decoding apparatus according to an exemplary embodiment.

Referring to FIG. 16, the multilayer video decoding apparatus 1600 includes a parser 1605, a video decoder 1610, a DPB 1620, and a DPB controller 1630.

The parser 1605 receives an encoded bitstream and obtains from the bitstream a Video Parameter Set (VPS), a Sequence Parameter Set (SPS), a Picture Parameter Set (PPS), a slice, and a SEI message. In particular, the parser 1605 obtains, from the bitstream, RPS information for determining a reference relationship between pictures included in an encoded multilayer. RPS information is included in a slice header of each picture and is first encoded before a decoding process of each picture. RPS information may include interlayer RPS information indicating a reference relationship between pictures of a multilayer included in one access unit and having a same POC, in terms of interlayer prediction. That is, RPS information includes information about a reference picture referred to by a current picture during interlayer prediction. Also, RPS information may include first short-term RPS information (RefPicSetStCurrBefore), second short-term RPS information (RefPicSetStCurrAfter), third short-term RPS information (RefPicSetStFoll), first long-term RPS information (RefPicSetLtCurr), and second long-term RPS information (RefPicSetLtFoll).

The video decoder 1610 decodes pictures included in a multilayer. The video decoder 1610 determines a reference relationship between multilayer pictures based on RPS information obtained from the bitstream, and decodes each picture according to a prediction mode of each picture. The video decoder 1120 may decode a multilayer video based on coding units having a tree structure.

The picture decoded by the video decoder 1610 is stored in the DPB 1620. When the decoded picture is initially stored in the DPB 1620, the DPB controller 1630 marks a picture that is decoded as a default as a short-term reference picture. The picture marked as the short-term reference picture may be marked as a long-term reference picture or a picture unused for reference based on RPS information included in a slice header of a picture that is subsequently decoded.

According to an exemplary embodiment, a picture encoded through interlayer prediction may be predicted by referring to a picture of other layer that is previously encoded and then reconstructed. A first layer picture may be firstly decoded and stored in the DPB 1620, and the DPB controller 1630 marks the first layer picture as a default as a short-term reference picture. When a second layer picture having a same POC as the first layer picture is interlayer predicted by referring to the first layer picture, decoding the second layer picture is performed by attempting to reference to the first layer picture stored in the DPB 1620. In such attempt, the DPB controller 1630 marks the first layer picture, which is marked as a short-term reference picture, as a long-term reference picture, based on interlayer RPS information of the second layer picture. In detail, the DPB controller 1630 obtains, from a slice header of the second layer picture, before decoding the second layer picture, information about a reference picture used by the second layer picture and pictures decoded after the second layer picture, during interlayer prediction. The DPB controller 1630 marks the first layer picture as a long-term reference picture if the first layer picture that is marked as a short-term reference picture and stored in the DBP 1620 is included in interlayer RPS information. That is, the DPB controller 1630 modifies the short-term reference state of the first layer picture to a long-term reference state when the first layer picture is used as a reference picture during interlayer prediction of other layer pictures.

As described above, the first layer picture marked as a short-term reference picture by default is changed to a long-term reference picture when the first layer picture is used as a reference picture during interlayer prediction because an error is generated during a process of scaling a prediction motion vector based on a POC difference when using a picture marked as a short-term reference picture as a reference picture. For example, when a prediction motion vector is mvp, and a POC of a current picture is POC1, and a POC of a short-term reference picture is POC2, a motion vector of the current picture referring to the short-term reference picture is obtained by scaling which includes a division process using a POC difference value as (mvp/(POC1−POC2)). However, during interlayer prediction, because a POC of the current picture and a POC of the reference picture are the same, (POC1−POC2) has a value of 0. Thus, when the reference picture having a same POC as the current picture is used as a short-term reference picture, an error may be generated when determining a motion vector of the current picture. However, when using a reference picture marked as a long-term reference picture, a motion vector is not obtained through a scaling process but a motion vector of a current picture is obtained using additional information. Thus, the DPB controller 1630 changes the reference picture marked as a short-term reference picture to a long-term reference picture when a decoded current picture is interlayer predicted by referring to a picture of other layers having the same POC.

The video decoder 1610 reconstructs the second layer picture by performing interlayer prediction on the second layer picture by referring to the first layer picture marked as a long-term reference picture. When pictures included in an access unit next to the current access unit, in which the first layer picture and the second layer picture are decoded, are decoded, RPS information is obtained from a slice header of a picture included in the next access unit. The DPB controller 1630 may determine, based on the RPS information, whether the first layer picture marked as a long-term reference picture is used as a reference picture for other pictures, and may maintain the long-term reference picture state of the first layer picture or change the reference state to an unused reference state.

Figure 17:
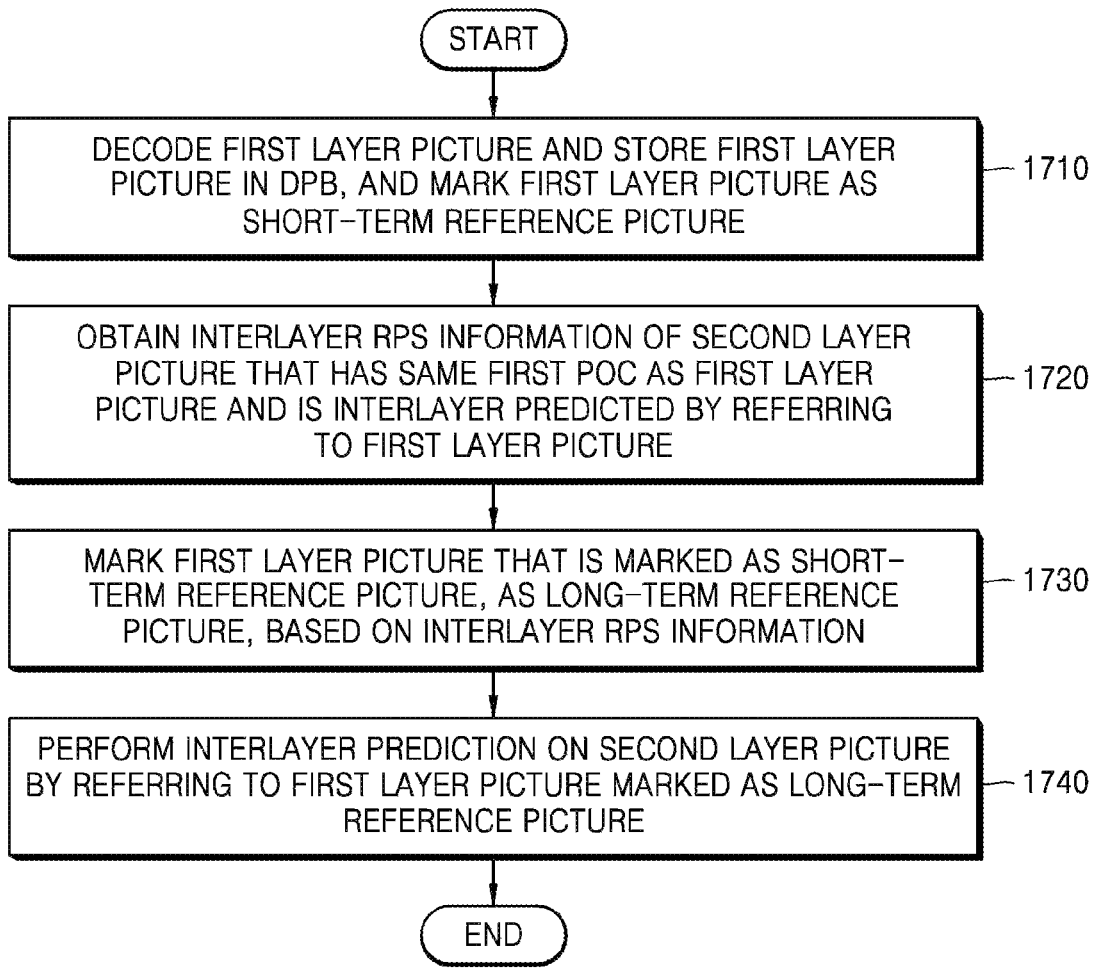
FIG. 17 is a flowchart of a multilayer video decoding method according to an exemplary embodiment.

FIG. 17 is a flowchart of a multilayer video decoding method according to an exemplary embodiment.

Referring to FIGS. 16 and 17, in operation 1710, the video decoder 1610 decodes the first layer picture and stores the decoded first layer picture in the DPB 1620, and the DPB controller 1630 marks the decoded first layer picture as a short-term reference picture.

In operation 1720, the parser 1605 obtains interlayer RPS information of the second layer picture that has the same first POC as a POC of the first layer picture and is interlayer predicted by referring to the first layer picture. The interlayer RPS information of the second layer picture includes information about a reference picture referred to during interlayer prediction of the second layer picture and pictures decoded after the second layer picture.

In operation 1730, the DPB controller 1630 marks the first layer picture marked as a short-term reference picture, as a long-term reference picture, based on the interlayer RPS information. In detail, the DPB controller 1630 changes, based on the interlayer RPS information, a reference state of the first layer picture to a long-term reference picture if the first layer picture corresponds to one of reference pictures referred to during interlayer prediction of the second layer picture and a picture decoded after the second layer picture.

In operation 1740, the video decoder 1610 performs interlayer prediction on the second layer picture by referring to the first layer picture marked as a long-term reference picture.

Hereinafter, RPS information that is used in determining a reference picture state of pictures that are previously decoded and stored in the DPB, according to an exemplary embodiment, will be described in detail.

RPS is information for managing a picture that is previously decoded and stored in the DPB. A picture that is previously decoded and stored in the DPB may not be used as a reference picture as decoding is performed. Decoded pictures stored in the DPB have to be efficiently managed in a decoding process by considering limited capacity of the DPB.

A picture that is previously decoded and stored in the DPB is marked as one of "used for short-term reference," "used for long-term reference," and "unused for reference." A picture marked as "unused for reference" is not any longer used as a reference picture in a prediction process and is removed from the DPB. According to an exemplary embodiment, RPS information may be signaled for each slice of each picture. As such, the reason that RPS information is transmitted for each slice of each picture is to provide error robustness. Also, according to an exemplary embodiment, RPS information may include reference picture information used by a current picture and pictures decoded after the current picture.

Figure 19:
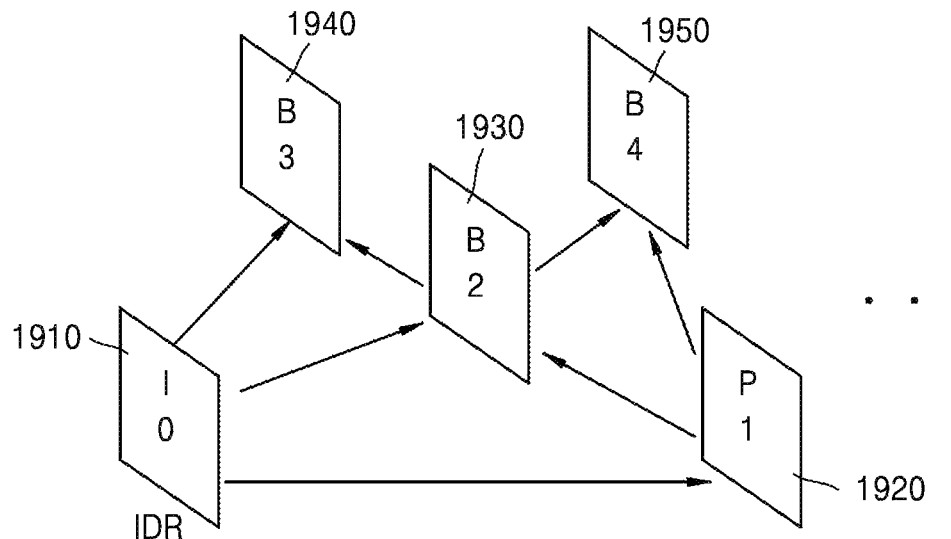
FIG. 19 illustrates a coding structure for explaining a RPS according to an exemplary embodiment.

FIG. 19 illustrates a coding structure for explaining a RPS according to an exemplary embodiment.

FIG. 19 illustrates a reference relationship between pictures. An arrow direction denotes a reference direction. That is, an picture I0 1910 is used as a reference picture for a picture P1 1920, a picture B2 1930, and a picture B3 1940. The numbers marked in each of I, B, and P pictures denote a decoding order. That is, the decoding order is the picture I0 1910, the picture P1 1920, the picture B2 1930, the picture B3 1940, and a picture B4 1950. Also, an order according to which respective pictures are arranged denotes an output order. That is, the output order is the picture I0 1910, the picture B3 1940, the picture B2 1930, the picture B4 1950, and the picture P1 1920.

Table 2 shows an example of RPS information having a coding structure having the reference relationship illustrated in FIG. 17.

TABLE 2

| Picture | RPS {reference picture, used by current picture} |
|---|---|
| I0 | — |
| P1 | {I0, 1} |
| B2 | {I0, 1}, {P1, 1} |
| B3 | {I0, 1}, {P1, 0}, {B2, 1} |
| B4 | {P1, 1}, {B2, 1} |

Referring to Table 2, RPS information may include, for example, {reference picture, used by current picture}. "reference picture" denotes a picture that is previously decoded and stored in a DBP with respect to a current picture in a decoding order and that is used as a reference picture for the current picture or pictures after the current picture. "used by current picture" is a flag indicating whether a picture stored in the DPB is used as a reference picture for the current picture or as a reference picture for a picture decoded after the current picture. That is, if used by current picture is 1, the corresponding picture is a picture referred to by the current picture, and if used by current picture is 0, the corresponding picture is used as a reference picture for a picture decoded after the current picture.

Referring to FIG. 19, the picture I0 1910 is an initially decoded IDR picture, and because there is no picture decoded prior to an IDR picture in a decoding order, RPS information about the picture I0 1910 which is an IDR picture is not additionally signaled. The picture P1 1920 that is decoded as a second picture uses the picture I0 1910 as a reference picture. Thus, a RPS included in a slice header of the picture P1 1920 includes {I0, 1} which is RPS information indicating whether the previously decoded picture I0 1910 is used as a reference picture for the picture P1 1920 or pictures decoded after the picture P1 1920. Similarly, the picture B2 1930 that is decoded as a next picture uses both the picture I0 1910 and the picture P1 1920 that are previously decoded and stored in the DPB, as reference pictures, and thus, RPS information of the picture B2 1930 includes {I0, 1}, {P1, 1}.

The picture B2 1940 that is decoded as a next picture is predicted by referring to the picture I0 1910 and the picture B2 1930, and thus, includes {I0, 1}, {B2, 1} as RPS information. Although the picture P1 1920 is not used as a reference picture for the picture B2 1940, the picture P1 1920 is used as a reference picture for the picture B4 1950 decoded after the picture B3 1940. Thus, the picture B3 1940 includes {P1, 0} as RPS information. In other words, when {P1, 0} is included in RPS information included in a slice header of the picture B3 1940, the picture P1 1920 is not used as a reference picture for the currently decoded picture B3 1940, but is used as a reference picture for pictures that are decoded after the picture B3 1940.

The B4 picture I950 that is decoded next uses the picture B2 1930 and the picture P1 1920 as reference pictures. Thus, RPS information of the picture B4 1950 includes {P1, 1}, {B2,1}.

When decoding respective pictures according to a decoding order, a reference state of the pictures that are previously decoded and stored in the DPB may be changed based on RPS information of the pictures. For example, RPS information of the picture B4 1950 does not include the picture I0 1910. Thus, it may be determined that the picture B4 1950 and pictures decoded after the picture B4 1950 do not use the picture I0 1910 as a reference picture anymore, and the I0 picture I910 is marked as unused for reference.

Meanwhile, a time to decode RPS information included in a slice header of each picture is decoded before a current picture is decoded.

Figure 20:
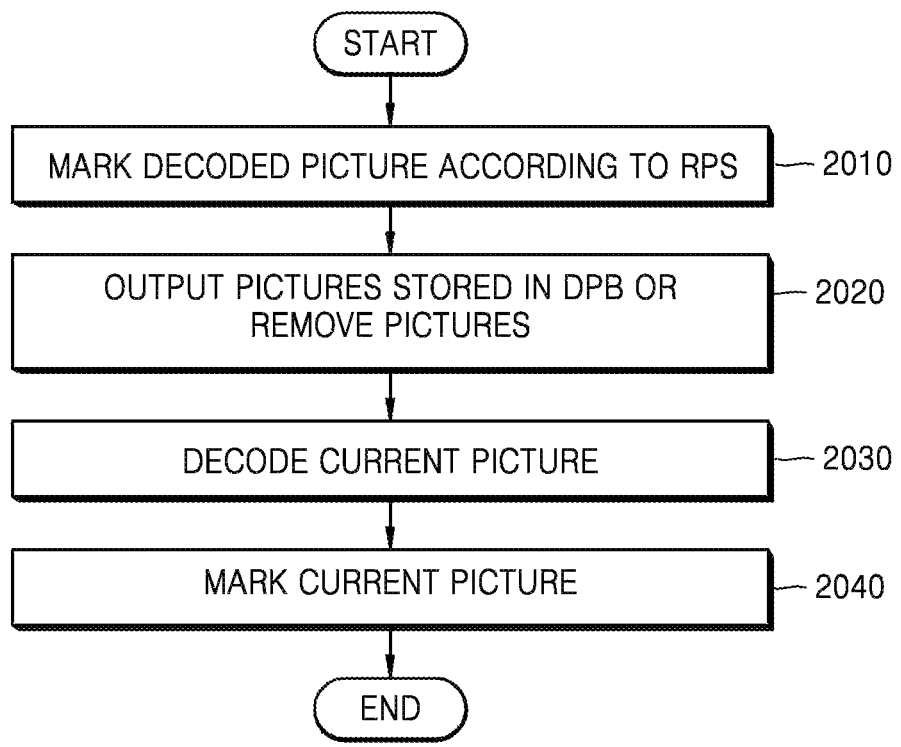
FIG. 20 is a flowchart of a process of decoding RPS information and decoding of a current picture according to an exemplary embodiment.

FIG. 20 is a flowchart of a process of decoding RPS information and decoding of a current picture according to an exemplary embodiment.

Referring to FIG. 20, in operation 2010, decoded pictures stored in the DPB are marked based on RPS information of the current picture. A picture, whose RPS information is unavailable or that is initially decoded and stored in the DPB, is marked as a short-term reference picture as a default.

In operation 2020, pictures stored in the DPB are output or removed from the DPB based on the RPS information of the current picture.

In operation 2030, the current picture is decoded, and in operation 2040, the decoded current picture is stored in the DPB, and the decoded current picture stored in the DPB is marked as a short-term reference picture as a default, as described above. A reference picture state of the current picture marked as a short-term reference picture is changed based on RPS information of pictures decoded after the current picture.

As such, according to an exemplary embodiment, RPS information is decoded first before the current picture is decoded, and reference pictures stored in the DPB are arranged based on the RPS information, and the current picture is decoded using the arranged reference pictures of the DPB.

As described above, RPS information is included in a slice header of each picture and signaled. However, because no picture is decoded prior to an IDR picture in a decoding order, RPS is not signaled with respect to the IDR picture. However, RPS may be transmitted with respect to an I slice of a RAP picture except the IDR picture because pictures that are decoded after an I picture in a decoding order may be allowed to refer to a picture decoded before the I picture.

Each picture included in RPS information may be identified as POC information indicating an output order. A POC of a picture included in RPS information may be signaled by using pic_order_cnt_lsb indicating least significant bit (LSB) of a POC from among entire POC values.

Meanwhile, reference picture information included in RPS information according to an exemplary embodiment may be largely classified into six subsets which are first short-term RPS information (RefPicSetStCurrBefore), second short-term RPS information (RefPicSetStCurrAfter), third short-term RPS information (RefPicSetStFoll), first long-term RPS information (Ref), second long-term RPS information (RefPicSetLtFoll), and interlayer RPS information (RefPicSetIvCurr).

The first short-term RPS information (RefPicSetStCurrBefore) includes information about short-term reference pictures that are in the same layer as a current picture to be currently decoded and are prior to the current picture both in a decoding order and an output order, and that may be used as a reference picture for the current picture.

The second short-term RPS information (RefPicSetStCurrAfter) includes information about short-term reference pictures that are in the same layer as the current picture and are prior to the current picture in a decoding order and are after the current picture in an output order, and that may be used as a reference picture for the current picture. The third short-term RPS information (RefPicSetStFoll) includes information about short-term reference pictures that are in the same layer as the current picture and that may be referred to by pictures following the current picture in a decoding order and that are not used as a reference picture for the current picture.

The first long-term RPS information (RefPicSetLtCurr) includes information about a long-term reference picture that is in the same layer as the current picture and may be used as a reference picture for the current picture. The second long-term RPS information (RefPicSetLtFoll) includes information about a long-term reference picture that is in the same layer as the current picture and that may be referred to by pictures following the current picture in a decoding order and are not used as a reference picture for the current picture.

The interlayer RPS information (RefPicSetIvCurr) includes information about a reference picture that has a POC that is the same as a POC of the current picture, that is in a different layer from the current picture, and that may be used as a reference picture for the current picture.

As described above, the DPB controller 1630 marks a picture stored in the DPB 1620 as one of a short-term reference picture, a long-term reference picture, and a picture unused for reference. The DPB controller 1630 may determine whether a picture stored in the DPB 1620 is used as a reference picture for the current picture based on the first short-term RPS information (RefPicSetStCurrBefore), the second short-term RPS information (RefPicSetStCurrAfter), the third short-term RPS information (RefPicSetStFoll), the first long-term RPS information (RefPicSetLtCurr), and the second long-term RPS information (RefPicSetLtFoll). If a picture stored in the DPB 1620 is included in one of the first short-term RPS information (RefPicSetStCurrBefore), the second short-term RPS information (RefPicSetStCurrAfter), the first long-term RPS information (RefPicSetLtCurr), and the interlayer RPS information (RefPicSetIvCurr), it is determined that the picture stored in the DPB 1620 is used as a reference picture for the current picture. If a picture stored in the DPB 1620 is included in one of the third short term RPS information (RefPicSetStFoll) and the second long-term RPS information (RefPicSetLtFoll), the picture stored in the DPB 1620 is not used as a reference picture for the current picture but may be used as a reference picture for pictures decoded after the current picture.

Figure 21:
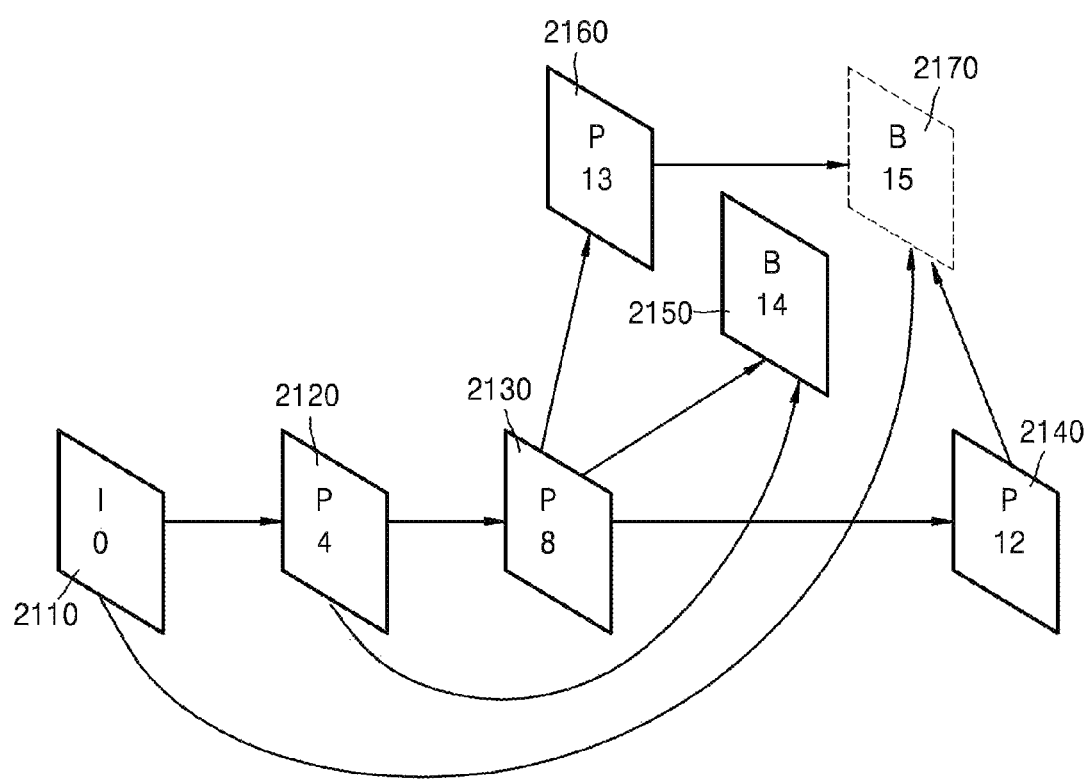
FIG. 21 is a reference view for explaining RPS subsets except interlayer RPS information according to an exemplary embodiment.

FIG. 21 is a reference view for explaining RPS subsets except interlayer RPS information according to an exemplary embodiment.

In FIG. 21, it is assumed that a current picture is a picture B14 2150, and an arrow direction denotes a reference direction, and only an picture I0 2110 and a picture P4 2120 from among pictures decoded before a decoding time of the current picture B14 2150 are marked as long-term reference pictures. In addition, an order in which pictures are arranged denotes an output order, and the number marked on each picture denotes a decoding order.

A picture P8 2130 is referred to by the picture B14 2150 when the picture B14 2150 is decoded, and is prior to the picture B14 2150 both in a decoding order and an output order, and thus, first short-term RPS information (RefPicSetStCurrBefore) of the picture B14 2150 includes the picture P8 2130. A picture P12 2140 is referred to by the picture B14 2150 and is prior to the picture B14 2150 in a decoding order but is after the picture B14 2150 in an output order. Thus, second short-term RPS information (RefPicSetStCurrAfter) of the picture B14 2150 includes the picture P12 2140. The picture P13 2160 is not referred to by the picture B14 2150 but is referred to by a picture B15 2170 that is decoded after the picture B14 2150. Thus, third short-term RPS information (RefPicSetStFoll) of the picture B14 2150 includes the picture P13 2160.

The picture P4 2120 is a long-term reference picture and is used as a reference picture for the picture B14 2150. Thus, first long-term RPS information (RefPicSetLtCurr) of the picture B14 2150 includes the picture P4 2120. The picture I0 2110 is a long-term reference and is not used as a reference picture for the picture B14 2150 but is used as a reference picture for the picture B15 2170 that is decoded after the picture B14 2150. Thus, second long-term RPS information (RefPicSetLtFoll) of the picture B4 2150 includes the picture I0 2110.

As described above, the RPS further includes, in addition to five subsets obtained with respect to the same layer, interlayer RPS information (RefPicSetIvCurr) about pictures used as reference pictures during interlayer prediction.

Figure 22:
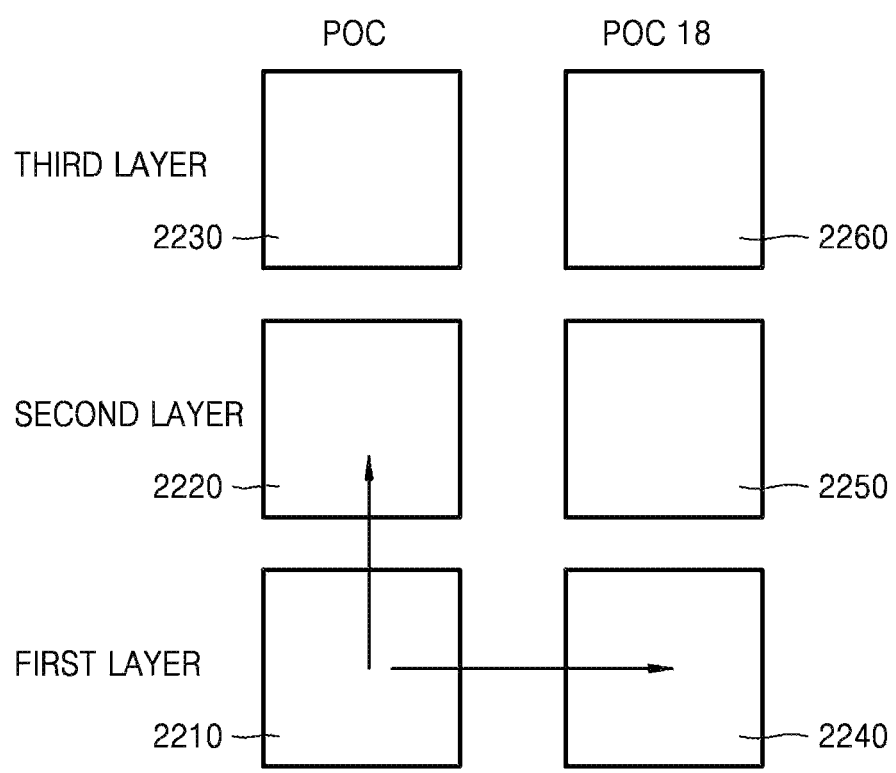
FIG. 22 is a reference view for explaining interlayer RPS information.

FIG. 22 is a reference view for explaining interlayer RPS information.

Referring to FIG. 22, it is assumed that a first picture 2210 of a first layer is first decoded and marked as a short-term reference picture and stored in a DPB. As illustrated in FIG. 22, the first picture 2210 of the first layer is assumed as a reference picture for a second picture 2220 of a second layer and a fourth picture 2240 that is in the same layer and has a different POC. In this case, interlayer RPS information (RefPicSetIvCurr) from among RPS information of the second picture 2220 of the second layer includes the first picture 2210 of the first layer used as a reference picture during interlayer prediction. Thus, when decoding the second picture 2220 of the second layer, the DPB controller 1630 may determine, based on the interlayer RPS information (RefPicSetIvCurr) obtained from a slice header of the second picture 2210, that the first picture 2210 of the first layer is used as a reference picture for interlayer prediction of the second picture 2220. As described above, the first picture 2210 used as a reference picture during interlayer prediction is marked as a long-term reference picture in a short-term reference picture state by considering error that may be generated in a process of obtaining a prediction motion vector. The reference picture state of the first picture 2210 marked as a long-term reference picture is updated based on RPS information of the fourth picture 2240 that is included in the same first layer and has a different POC. In regard to FIG. 22, the fourth picture 2240 refers to the first picture 2210, and thus, the reference picture state of the first picture 2210 maintains the long-term reference picture state. If the fourth picture 2240 does not refer to the first picture 2210, and if the first picture 2210 is also not referred to by other pictures 2250, 2260 decoded after the fourth picture 2240, the reference picture state of the first picture 2210 is updated to a picture unused for reference.

According to the exemplary embodiments, a reference relationship between pictures may be efficiently transmitted by reflecting interlayer prediction of pictures included in a multilayer video. Also, according to the exemplary embodiments, a decoded picture buffer that is used to decode a multilayer video may be efficiently managed.

The exemplary embodiments may also be implemented as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the exemplary embodiments have been particularly shown and described with reference to the drawings, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the inventive concept is defined not by the detailed description of the invention but by the appended claims, and all differences within the scope will be construed as being included in the inventive concept.

The invention claimed is:

1. A multilayer video decoding method comprising:
   decoding a first layer picture and storing the first layer picture in a decoded picture buffer (DPB) and marking the first layer picture as a short-term reference picture;
   obtaining interlayer reference picture set (RPS) information of a second layer picture that has a same first picture order count (POC) as a POC of the first layer picture and is interlayer predicted by referring to the first layer picture;

marking the first layer picture marked as the short-term reference picture, as a long-term reference picture based on the interlayer RPS information;

performing interlayer prediction on the second layer picture by referring to the first layer picture marked as the long-term reference picture, wherein the interlayer RPS information includes information about a reference picture used for interlayer prediction of the second layer picture and pictures that are decoded after the second layer picture, wherein the marking comprises, when the first layer picture marked as the short-term reference picture is included in the interlayer RPS information, marking the first layer picture as the long-term reference picture, wherein the obtaining further comprises obtaining first short-term RPS information (RefPicSetStCurrBefore) including information about short-term reference pictures that are in a same layer as a current picture to be decoded and are prior to the current picture both in a decoding order and an output order, and that may be used as a reference picture of the current picture, second short-term RPS information (RefPicSetStCurrAfter) including information about short-term reference pictures that are in the same layer as the current picture and are prior to the current picture in a decoding order and are after the current picture in an output order, and that may be used as a reference picture for the current picture, third short-term RPS information (RefPicSetStFoll) including information about short-term reference pictures that are in the same layer as the current picture and that may be referred to by pictures following the current picture in a decoding order and are not used as a reference picture for the current picture, first long-term RPS information (RefPicSetLtCurr) including information about a long-term reference picture that is in the same layer as the current picture and may be used as a reference picture for the current picture, and second long-term RPS information (RefPicSetLtFoll) including information about a long-term reference picture that is in the same layer as the current picture and that may be referred to by pictures following the current picture in a decoding order and are not used as a reference picture for the current picture; and marking a decoded picture stored in the decoded picture buffer as one of a short-term reference picture, a long-term reference picture, and a picture unused for reference by using the obtained first short-term RPS information (RefPicSetStCurrBefore), the second short-term RPS information (RefPicSetStCurrAfter), the third short-term RPS information (RefPicSetStFoll), the first long-term RPS information (RefPicSetLtCurr), the second long-term RPS information (RefPicSetLtFoll), and the interlayer RPS information.

2. The multilayer video decoding method of claim 1, further comprising:

obtaining RPS information of a picture that is decoded after the second layer picture and has a second POC that is different from the POC of the first layer picture; and updating a reference picture state of the first layer picture marked as the long-term reference picture based on the RPS information of the picture having the second POC.

3. The multilayer video decoding method of claim 2, wherein the updating comprises obtaining from the RPS information of the picture having the second POC information about a reference picture for the picture having the second POC and pictures that are decoded after the picture having the second POC, maintaining a reference picture state of the first layer picture marked as the long-term reference picture when the first layer picture marked as the long-term reference picture is included in the RPS information, and marking the first layer picture marked as the long-term reference picture as unused for reference when the first layer picture marked as the long-term reference picture is not included in the RPS information.

4. A multilayer video decoding apparatus comprising:

a decoded picture buffer configured to store a decoded picture;

a parser configured to obtain interlayer reference picture set (RPS) information of a second layer picture that has a same first POC as a POC of a previously decoded first layer picture and is interlayer predicted by referring to the first layer picture;

a decoded picture buffer controller configured to store the first layer picture in the decoded picture buffer, mark the first layer picture as a short-term reference picture, and mark the first layer picture marked as the short-term reference picture, as a long-term reference picture, based on the interlayer RPS information; and a video encoder configured to decode pictures included in a multilayer, and perform interlayer prediction on the second layer picture by referring to the first layer picture marked as the long-term reference picture, wherein the interlayer RPS information comprises interlayer RPS information used as a reference picture for interlayer prediction of the second layer picture and pictures decoded after the second layer picture, wherein the decoded picture buffer controller is configured to mark, when the first layer picture marked as the short-term reference picture is included in the interlayer RPS information, the first layer picture as the long-term reference picture, wherein the receiver obtains first short-term RPS information (RefPicSetStCurrBefore) including information about short-term reference pictures that are in a same layer as a current picture to be decoded and are prior to the current picture both in a decoding order and an output order, and that may be used as a reference picture for the current picture, second short-term RPS information (RefPicSetStCurrAfter) including information about short-term reference pictures that are in the same layer as the current picture and are prior to the current picture in a decoding order and are after the current picture in an output order, and that may be used as a reference picture for the current picture, third short-term RPS information (RefPicSetStFoll) including information about short-term reference pictures that are in the same layer as the current picture and that may be referred to by pictures following the current picture in a decoding order and are not used as a reference picture for the current picture, first long-term RPS information (RefPicSetLtCurr) including information about a long-term reference picture that is in the same layer as the current picture and may be used as a reference picture for the current picture, and second long-term RPS information (RefPicSetLtFoll) including information about a long-term reference picture that is in the same layer as the current picture and that may be referred to by pictures following the current picture in a decoding order and are not used as a reference picture for the current picture, and wherein the decoded picture buffer controller is configured to mark a decoded picture stored in the decoded picture buffer as one of a short-term reference picture, a long-term reference picture, and a picture unused for reference by using the obtained first short-term RPS information (RefPicSetStCurrBefore), the second short-term RPS information (RefPicSetStCurrAfter), the third short-term RPS information (RefPicSetStFoll), the first long-term RPS information (RefPicSetLtCurr), and the second long-term RPS information (RefPicSetLtFoll) and the interlayer RPS information.

5. The multilayer video decoding apparatus of claim 4, wherein the receiver obtains interlayer RPS information of a picture that is decoded after the second layer picture and has a second POC that is different from the POC of the first layer picture, wherein the decoded picture buffer controller updates a reference picture state of the first layer picture marked as the long-term reference picture based on the interlayer RPS information of the picture having the second POC.

6. The multilayer video decoding apparatus of claim 5, wherein the decoded picture buffer controller obtains, from the RPS information of the picture having the second POC, information about a reference picture for the picture having the second POC and pictures decoded after the picture having the second POC, maintains a reference picture state of the first layer picture marked as the long-term reference picture when the first layer picture marked as the long-term reference picture is included in the RPS information, and marks the first layer picture marked as the long-term reference picture as unused for reference when the first layer picture marked as the long-term reference picture is not included in the RPS information.

* * * * *